US009221461B2

(12) United States Patent
Ferguson et al.

(10) Patent No.: US 9,221,461 B2
(45) Date of Patent: *Dec. 29, 2015

(54) CONSTRUCTION ZONE DETECTION USING A PLURALITY OF INFORMATION SOURCES

(75) Inventors: David Ian Ferguson, San Francisco, CA (US); Dirk Haehnel, Menlo Park, CA (US); Nathaniel Fairfield, Mountain View, CA (US)

(73) Assignee: Google Inc., Mountain View, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 13/603,613

(22) Filed: Sep. 5, 2012

(65) Prior Publication Data

US 2014/0067187 A1 Mar. 6, 2014

(51) Int. Cl.
| | | |
|---|---|---|
| G01C 22/00 | (2006.01) | |
| G05D 1/00 | (2006.01) | |
| B60W 30/00 | (2006.01) | |
| B60W 30/12 | (2006.01) | |
| B60W 30/16 | (2012.01) | |

(52) U.S. Cl.
CPC .............. *B60W 30/00* (2013.01); *B60W 30/12* (2013.01); *B60W 30/16* (2013.01); *B60W 2420/42* (2013.01); *B60W 2420/52* (2013.01); *B60W 2550/40* (2013.01); *B60W 2550/402* (2013.01)

(58) Field of Classification Search
USPC ........................................ 701/23, 26, 28, 301
See application file for complete search history.

(56) References Cited

U.S. PATENT DOCUMENTS

| | | | | |
|---|---|---|---|---|
| 5,220,497 | A * | 6/1993 | Trovato et al. | 700/56 |
| 6,560,529 | B1 * | 5/2003 | Janssen | 701/469 |
| 6,970,779 | B2 * | 11/2005 | Kagawa et al. | 701/93 |
| 7,979,173 | B2 | 7/2011 | Breed | |
| 8,031,085 | B1 | 10/2011 | Anderson | |
| 8,060,271 | B2 | 11/2011 | Dolgov et al. | |
| 8,311,274 | B2 * | 11/2012 | Bergmann et al. | 382/103 |
| 8,311,695 | B2 * | 11/2012 | McKitterick | 701/23 |
| 8,332,134 | B2 * | 12/2012 | Zhang et al. | 701/301 |
| 2006/0184297 | A1 * | 8/2006 | Higgins-Luthman | 701/41 |
| 2008/0189040 | A1 | 8/2008 | Nasu et al. | |

(Continued)

FOREIGN PATENT DOCUMENTS

| | | |
|---|---|---|
| EP | 2072316 | 6/2009 |
| JP | 2007-280132 A1 | 10/2007 |
| JP | 2010-221909 | 10/2010 |

OTHER PUBLICATIONS

International Searching Authority, International Search Report and Written Opinion for PCT/US203/053944 mailed Jan. 21, 2014, 11 pages.

*Primary Examiner* — Yonel Beaulieu
*Assistant Examiner* — Lail Kleinman
(74) *Attorney, Agent, or Firm* — McDonnell Boehnen Hulbert & Berghoff LLP

(57) ABSTRACT

Methods and systems for detection of a construction zone using information from a plurality of sources are described. In an example, a computing device, configured to control the vehicle, may be configured to receive information, from a plurality of sources, relating to detection of a construction zone on the road on which the vehicle is travelling. Also, the computing device may be configured to determine a likelihood of existence of the construction zone on the road, based on the information. Further the computing device may be configured to modify a control strategy associated with a driving behavior of the vehicle, based on the likelihood; and control the vehicle based on the modified control strategy.

15 Claims, 13 Drawing Sheets

(56) References Cited

U.S. PATENT DOCUMENTS

| | | | |
|---|---|---|---|
| 2009/0149990 A1* | 6/2009 | Myeong et al. | 700/245 |
| 2010/0099353 A1 | 4/2010 | Komori | |
| 2010/0104199 A1* | 4/2010 | Zhang et al. | 382/199 |
| 2010/0164701 A1* | 7/2010 | Bargman et al. | 340/436 |
| 2010/0207787 A1* | 8/2010 | Catten et al. | 340/905 |
| 2010/0274430 A1 | 10/2010 | Dolgov et al. | |
| 2011/0280026 A1* | 11/2011 | Higgins-Luthman | 362/466 |
| 2012/0022764 A1 | 1/2012 | Tang et al. | |
| 2012/0083960 A1* | 4/2012 | Zhu et al. | 701/23 |
| 2012/0150425 A1* | 6/2012 | Chapman et al. | 701/119 |
| 2012/0176234 A1* | 7/2012 | Taneyhill et al. | 340/453 |
| 2013/0066511 A1* | 3/2013 | Switkes et al. | 701/28 |

* cited by examiner

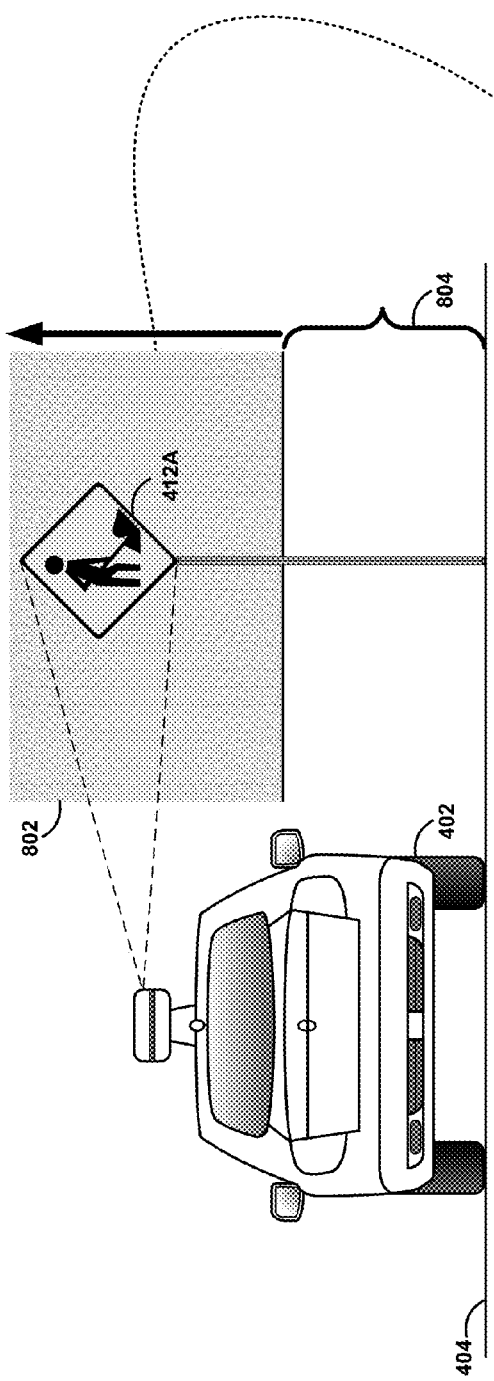
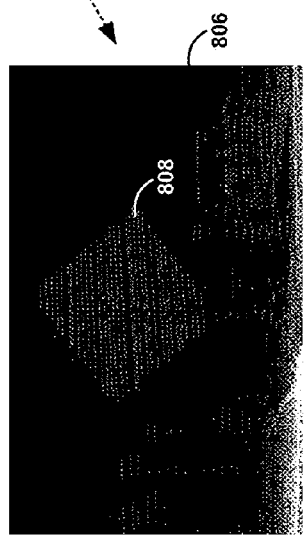
FIGURE 8A
FIGURE 8B

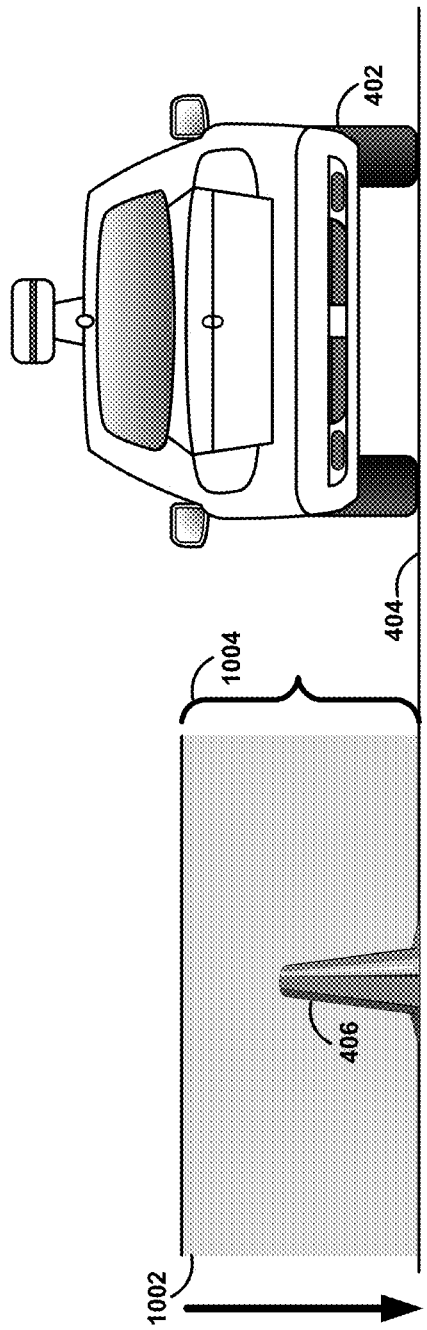
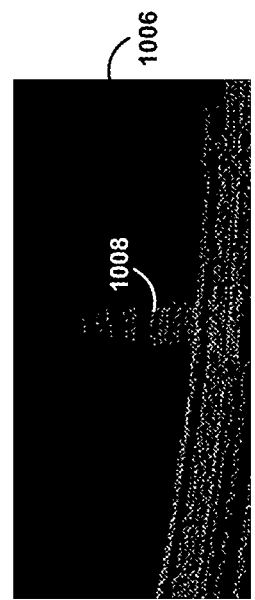
FIGURE 10A
FIGURE 10B

COMPUTER PROGRAM PRODUCT 1100

SIGNAL BEARING MEDIUM 1101

PROGRAM INSTRUCTIONS 1102

- RECEIVING, AT A COMPUTING DEVICE CONFIGURED TO CONTROL A VEHICLE, FROM A PLURALITY OF SOURCES OF INFORMATION, INFORMATION RELATING TO DETECTION OF A CONSTRUCTION ZONE ON A ROAD ON WHICH THE VEHICLE IS TRAVELLING, AND EACH SOURCE OF INFORMATION OF THE PLURALITY OF SOURCES OF INFORMATION IS ASSIGNED A RESPECTIVE RELIABILITY METRIC INDICATIVE OF A LEVEL OF CONFIDENCE OF THE DETECTION OF THE CONSTRUCTION ZONE BASED ON THE INFORMATION RECEIVED FROM THAT SOURCE OF INFORMATION

- DETERMINING, USING THE COMPUTING DEVICE, A LIKELIHOOD OF EXISTENCE OF THE CONSTRUCTION ZONE ON THE ROAD, BASED ON THE INFORMATION AND RESPECTIVE RELIABILITY METRICS OF THE PLURALITY OF SOURCES OF INFORMATION

- MODIFYING, USING THE COMPUTING DEVICE, A CONTROL STRATEGY ASSOCIATED WITH A DRIVING BEHAVIOR OF THE VEHICLE, BASED ON THE LIKELIHOOD

- CONTROLLING, USING THE COMPUTING DEVICE, THE VEHICLE BASED ON THE MODIFIED CONTROL STRATEGY

| COMPUTER READABLE MEDIUM 1103 | COMPUTER RECORDABLE MEDIUM 1104 | COMMUNICATIONS MEDIUM 1105 |

FIGURE 11

CONSTRUCTION ZONE DETECTION USING A PLURALITY OF INFORMATION SOURCES

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present application discloses embodiments that relate to detection of a construction zone using multiple information sources. In one aspect, the present application describes a method. The method may comprise receiving, at a computing device configured to control a vehicle, from a plurality of sources of information, information relating to detection of a construction zone on a road on which the vehicle is travelling. Each source of information of the plurality of sources of information may be assigned a respective reliability metric indicative of a level of confidence of the detection of the construction zone based on respective information received from that source of information. The method also may comprise determining, using the computing device, a likelihood of existence of the construction zone on the road, based on the information and respective reliability metrics of the plurality of sources of information. The method also may comprise modifying, using the computing device, a control strategy associated with a driving behavior of the vehicle, based on the likelihood; and further may comprise controlling, using the computing device, the vehicle based on the modified control strategy.

In another aspect, the present application describes a non-transitory computer readable medium having stored thereon instructions executable by a computing device of a vehicle to cause the computing device to perform functions. The functions may comprise receiving, from a plurality of sources of information, information relating to detection of a construction zone on a road on which the vehicle is travelling. Each source of information of the plurality of sources of information may be assigned a respective reliability metric indicative of a level of confidence of the detection of the construction zone based on respective information received from that source of information. The functions also may comprise determining a likelihood of existence of the construction zone on the road, based on the information and respective reliability metrics of the plurality of sources of information. The functions further may comprise modifying a control strategy associated with a driving behavior of the vehicle, based on the likelihood. The functions also may comprise controlling the vehicle based on the modified control strategy.

In still another aspect, the present application describes a control system for a vehicle. The control system may comprise a computing device. The computing device may be configured to receive, from a plurality of sources of information, information relating to detection of a construction zone on a road on which the vehicle is travelling. Each source of information of the plurality of sources of information may be assigned a respective reliability metric indicative of a level of confidence of the detection of the construction zone based on respective information received from that source of information. The computing device also may be configured to determine a likelihood of existence of the construction zone on the road, based on the information and respective reliability metrics of the plurality of sources of information. The computing device further may be configured to modify a control strategy associated with a driving behavior of the vehicle, based on the likelihood; and control the vehicle based on the modified control strategy.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 8A illustrates LIDAR-based detection of the construction zone sign in an area at a height greater than a threshold height from a surface of the road, in accordance with an example embodiment.

FIG. 8B illustrates a LIDAR-based image depicting the area at the height greater than the threshold height from the surface of the road, in accordance with an example embodiment.

FIG. 10A illustrates LIDAR-based detection of a construction zone cone in an area within a threshold distance from a surface of the road, in accordance with an example embodiment.

FIG. 10B illustrates a LIDAR-based image depicting the area within the threshold distance from the surface of the road, in accordance with an example embodiment.

FIG. 11 is a schematic illustrating a conceptual partial view of a computer program, in accordance with an example embodiment.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road may be configured to rely on maps for navigation. In some examples, changes due to existence of a construction zone on the road may not be reflected in the maps. Therefore, the autonomous vehicle may be configured to detect the construction zone and drive through the construction zone safely.

In an example, a computing device, configured to control the vehicle, may be configured to receive information, from a plurality of sources, relating to detection of a construction zone on the road on which the vehicle is travelling. Also, the computing device may be configured to determine a likelihood of existence of the construction zone on the road, based on the information. Further the computing device may be configured to modify a control strategy associated with a driving behavior of the vehicle, based on the likelihood; and control the vehicle based on the modified control strategy.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Figure 1:
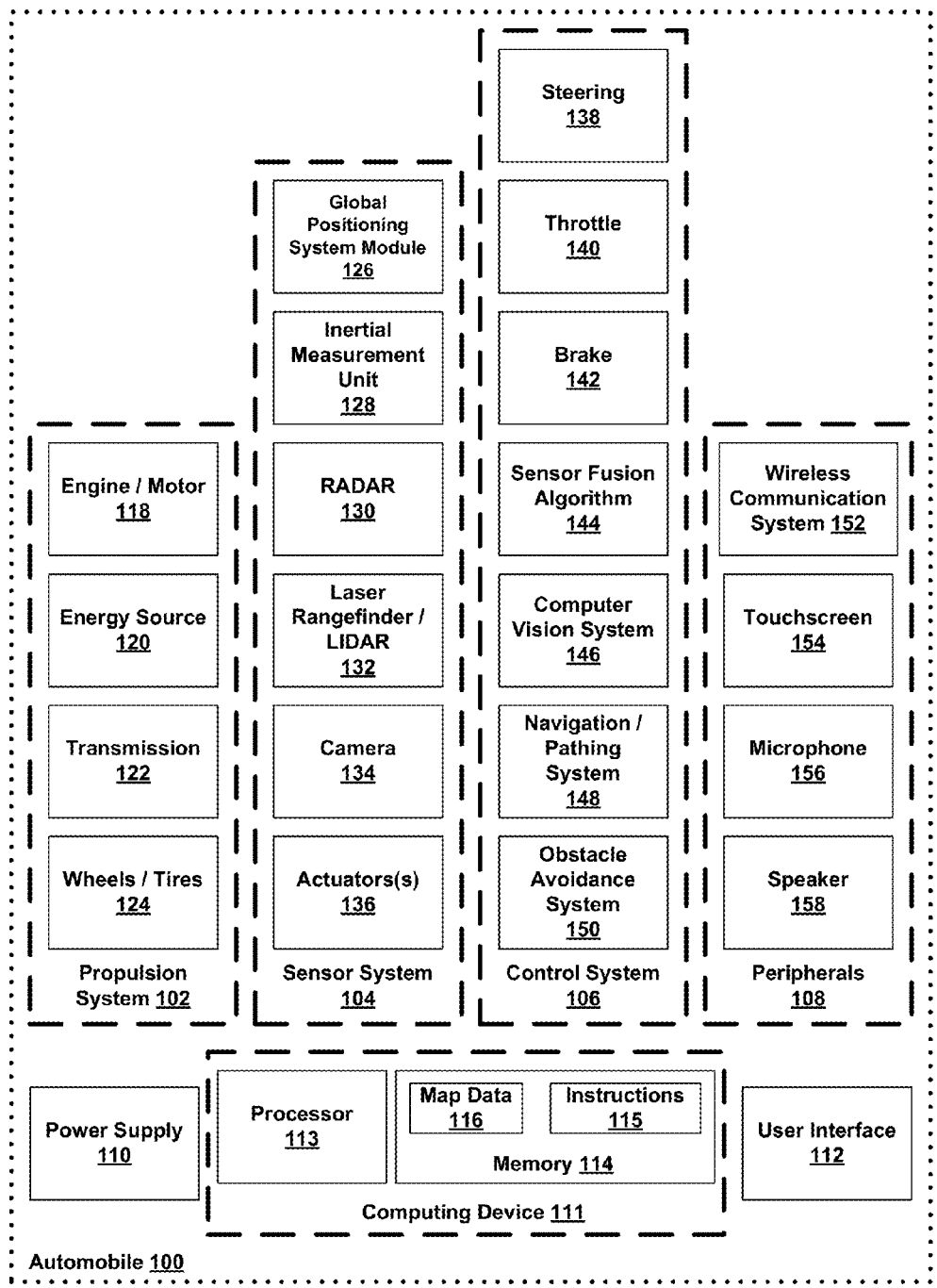
FIG. 1 is a simplified block diagram of an example automobile, in accordance with an example embodiment.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108.

The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. The light can be any type of electromagnetic waves such as laser. As an example, the LIDAR unit 132 may include a laser source and/or laser scanner configured to emit pulses of laser and a detector configured to receive reflections of the laser. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems are shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
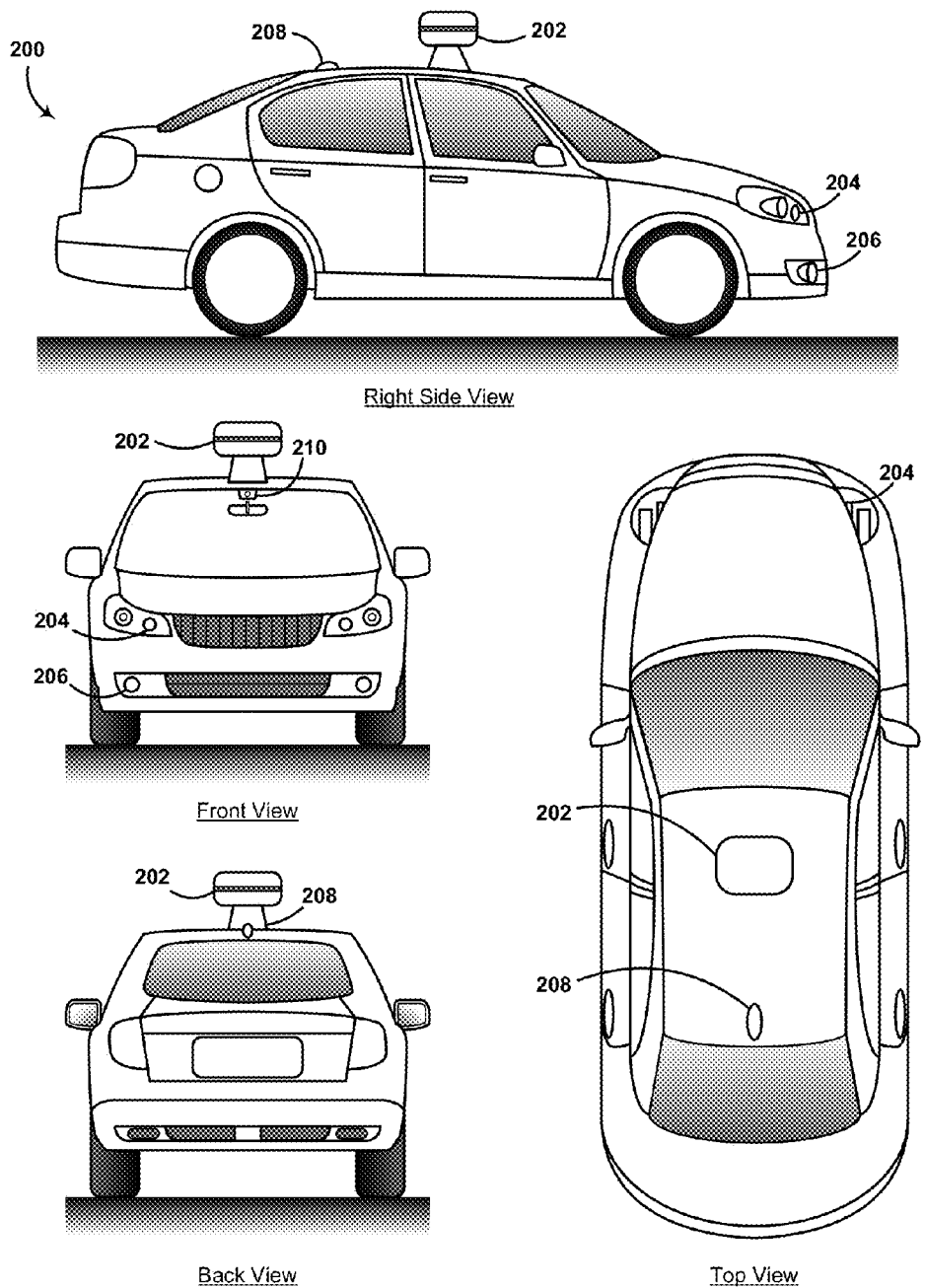
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
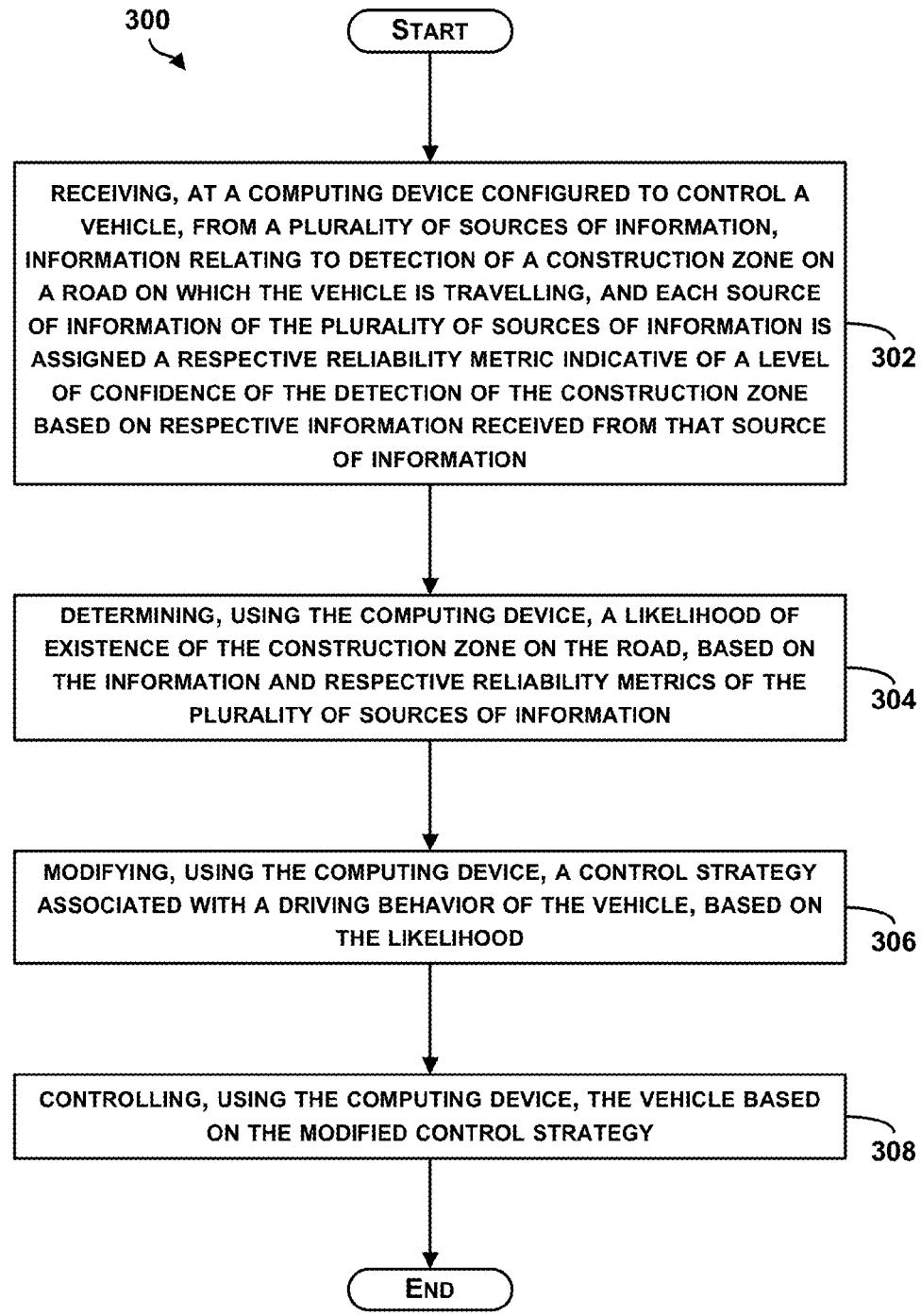
FIG. 3 is a flow chart of a method for detection of a construction zone using a plurality of sources of information of information, in accordance with an example embodiment.
Figure 4:
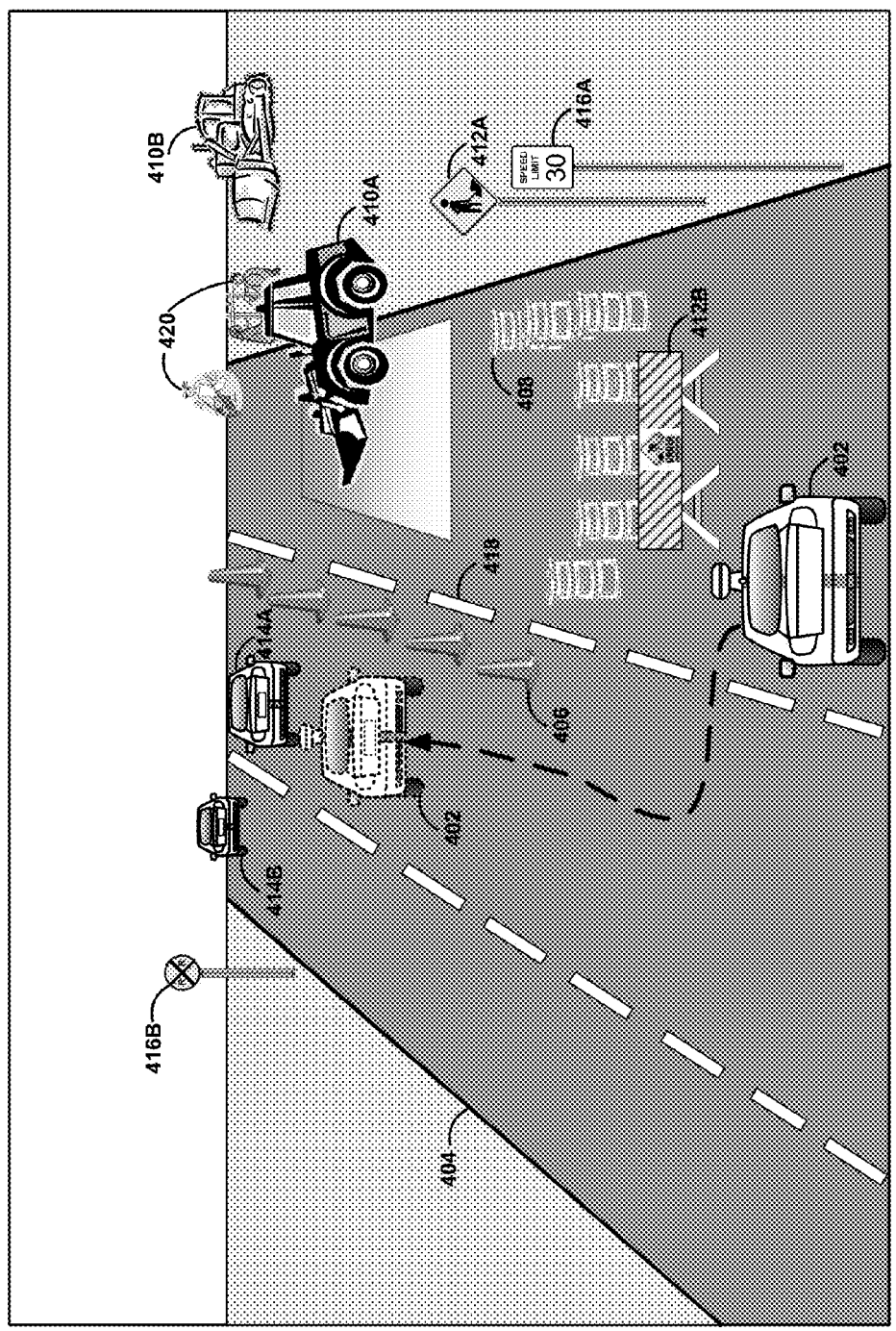
FIG. 4 illustrates a vehicle approaching a construction zone, in accordance with an example embodiment.

FIG. 3 is a flow chart of a method 300 for detection of a construction zone using a plurality of sources of information, in accordance with an example embodiment. FIG. 4 illustrates a vehicle approaching a construction zone, in accordance with an embodiment, to illustrate the method 300. FIGS. 3 and 4 will be described together.

The method 300 may include one or more operations, functions, or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes receiving, at a computing device configured to control a vehicle, from a plurality of sources of information, information relating to detection of a construction zone on a road on which the vehicle is travelling, and each source of information of the plurality of sources of information may be assigned a respective reliability metric indicative of a level of confidence of the detection of the construction zone based on the information received from that source of information. The computing device may be onboard the vehicle or may be off-board but in wireless communication with the vehicle, for example. Also, the computing device may be configured to control the vehicle in an autonomous or semi-autonomous operation mode. Further, the computing device may be configured to receive, from sensors coupled to the vehicle, information associated with, for example, condition of systems and subsystems of the vehicle, driving conditions, road conditions, etc.

FIG. 4 illustrates a vehicle 402 approaching a construction zone on a road 404. The computing device, configured to control the vehicle 402, may be configured to receive information relating to detection of the construction zone. The information may be received from a plurality of sources. For example, the information may include image-based information received from an image-capture device or camera (e.g., the camera 134 in FIG. 1, or the camera 210 in FIG. 2) coupled to the computing device. In one example, the image-capture device may be onboard the vehicle 402; but, in another example, the image-capture device may be off-board (e.g., a given camera coupled to a traffic signal post). The image-based information, for example, may be indicative of location of one or more static objects with respect to the road such as construction zone cone(s) 406, construction zone barrel(s) 408, construction equipment 410A-B, construction zone signs 412A-B, etc. The construction zone cone(s) 406 is used hereinafter to refer to a single cone or a group/series of cones. The image-based information also may be indicative of other objects related to construction zones such as orange vests and chevrons. The image-based information also may be indicative of road geometry (e.g., curves, lanes, etc.).

In another example, the information relating to the detection of the construction zone may include LIDAR-based information received from a light detection and ranging (LIDAR) sensor (e.g., the LIDAR unit 132 in FIG. 1) coupled to the vehicle 402 and in communication with the computing device. The LIDAR sensor may be configured to provide a three-dimensional (3D) point cloud of the road 404 and vicinity of the road 404. The computing device may be configured to identify objects (e.g., the construction zone cone(s) 406, the construction zone barrel(s) 408, the construction equipment 410A-B, the construction zone signs 412A-B, etc.) represented by sets of points in the 3D point cloud, for example.

In still another example, the information may include RADAR-based information received from a radio detection and ranging (RADAR) sensor (e.g., the RADAR unit 130 in FIG. 1) coupled to the vehicle 402 and in communication with the computing device. For example, the RADAR sensor may be configured to emit radio waves and receive back the emitted radio waves that bounced off objects on the road 404 or in the vicinity of the road 404. The received signals or RADAR-based information may be indicative of characteristics of an object off of which the radio waves bounced. The characteristics, for example, may include dimensional characteristics of the object, distance between the object and the vehicle 402, and whether the object is stationary or moving, in addition to speed and direction of motion.

In yet another example, the information may include traffic information. The traffic information may be indicative of behavior of other vehicles, such as vehicles 414A-B, on the road 404. As an example, the traffic information may be received from Global Positioning Satellite (GPS) devices coupled to the vehicles 414A-B. GPS information received from a respective GPS device may be indicative of a position of a respective vehicle including the respective GPS device with respect to the Earth, based on satellite-based positioning data.

In another example, the vehicles 414A-B may be configured to communicate location/position and speed information to a road infrastructure device (e.g., a device on a post on the road 404), and the infrastructure device may communicate such traffic information to the computing device. This communication may be referred to as vehicle-to-infrastructure communication. Vehicle-to-infrastructure communication may include wireless exchange of critical safety and operational data between vehicles (e.g., the vehicle 402 and the vehicles 414A-B) and road infrastructure, intended to enable a wide range of safety, mobility, road condition, traffic, and environmental information. Vehicle-to-infrastructure communication may apply to all vehicle types and all roads, and may transform infrastructure equipment into "smart infrastructure" through incorporation of algorithms that use data exchanged between vehicles and infrastructure elements to perform calculations, by the computing device coupled to the vehicle 402 for example, that may recognize high-risk situations in advance, resulting in driver alerts and warnings through specific countermeasures. As an example, traffic signal systems on the road 404 may be configured to communicate signal phase and timing (SPAT) information to the vehicle 402 to deliver active traffic information, safety advisories, and warnings to the vehicle 402 or a driver of the vehicle 402.

In still another example, the traffic information may be received from direct vehicle-to-vehicle communication. In this example, owners of the vehicles 402 and 414A-B may be given an option to opt in or out of sharing information between vehicles. The vehicles 414A-B on the road 404 may include devices (e.g., GPS devices coupled to the vehicles 414A-B or mobile phones used by drivers of the vehicles 414A-B) that may be configured to provide trackable signals to the computing device configured to control the vehicle 402. The computing device may be configured to receive the trackable signals and extract traffic information and behavior information of the vehicles 414A-B, for example.

In yet another example the traffic information may be received from a traffic report broadcast (e.g., radio traffic services). In yet still another example, the computing device may be configured to receive the traffic information from on-board or off-board sensors in communication with the computing device configured to control the vehicle 402. As an example, laser-based sensors can provide speed statistics of vehicles passing through lanes of a highway, and communicate such information to the computing device.

Based on the traffic information, the computing device may be configured to estimate nominal speeds and flow of traffic of other vehicles, such as the vehicles 414A-B, on the road 404. In an example, the computing device may be configured to determine a change in nominal speed and flow of traffic of the vehicles 414A-B based on the traffic information, and compare the change in behavior of the vehicles 414A-B to a predetermined or typical pattern of traffic changes associated with approaching a given construction zone.

In yet still another example, the information relating to detection of the construction zone may include map information related to prior or preexisting maps. For example, the map information may include information associated with traffic signs 416A-B, a number of lanes on the road 404, locations of lane boundaries, etc. The prior maps may be populated with existing signs manually or through electronic detection of the existing signs. However, the map information may not include information relating to recent road changes due to temporary road work that may cause changes to road lanes. For example, the map information may not include respective information relating to temporary construction zone signs such as the construction zone signs 412A-B.

Additionally, each source of information of the plurality of sources of information may be assigned a respective reliability metric. The reliability metric may be indicative of a level of confidence of the detection of the construction zone based on respective information received from that source of information. As an example for illustration, the traffic information may be more reliable in detecting the construction zone than the RADAR-based information; in other words, the computing device may be configured to detect, based on the traffic information, existence of a construction zone with level of confidence that is higher than a respective level of confidence of detecting the construction zone based on the RADAR-based information. In this example, the source of the traffic information may be assigned a higher reliability metric than the RADAR unit, which may be the source of the RADAR-based information. In examples, the reliability metric may be determined based on previously collected data from a plurality of driving situations.

Referring back to FIG. 3, at block 304, the method 300 includes determining, using the computing device, a likelihood of existence of the construction zone on the road, based on the information and respective reliability metrics of the plurality of sources of information. As an example, in FIG. 4, based on the information relating to detection of the construction zone and received from the plurality of sources at the computing device configured to control the vehicle 402, the computing device may be configured to determine a likelihood of existence of the construction zone on the road 404.

In an example, the computing device may be configured to determine, from the image-based information received from the image-capture device, a change in road geometry due to the construction zone, and may assign the likelihood based on the determined change. For example, the computing device may be configured to compare the determined change to a typical change associated with a typical construction zone, and determine the likelihood based on the comparison. As another example, the computing device may be configured to identify, using image recognition techniques known in the art, construction zone objects (e.g., the construction zone cone(s) 406, the construction zone barrel(s) 408, the construction zone signs 412A-B, the construction equipment 410A-B, or any other construction zone indicators) depicted in images captured by the image-capture device. In one example, the computing device may be configured to assign a respective likelihood of identification that may be indicative of a level of confidence associated with identifying construction zone objects, and determine the likelihood of the existence of the construction zone based on the respective likelihoods of identification for the construction zone objects.

Similarly, the computing device may be configured to identify the construction zone objects based on the LIDAR-based and/or RADAR-based information. As an example, the computing device may be configured to identify a candidate construction zone object (a candidate construction zone cone, barrel, or sign) represented by a set of points of a 3D point cloud provided by the LIDAR sensor; and the computing device may be configured to assign a respective likelihood of identification for the candidate construction zone object based on a respective level of confidence for identification of the object.

In an example, the computing device may be configured to compare a shape of the candidate construction zone object (identified in the image-based information, LIDAR-based information, or RADAR-based information) to one or more predetermined shapes of typical construction zone objects; and also may be configured to determine a match metric indicative of how similar the candidate construction zone object is to a given predetermined shape (e.g., a percentage of match between dimensional characteristics of the shape of the candidate object and the given predetermined shape). The computing device may be configured to determine the likelihood based on the match metric. The computing device also may be configured to use any of the techniques described below with regard to FIG. 9 to detect and/or identify construction zone objects.

In an example, the computing device may be configured to receive the map information associated with the road 404, and the map information may include locations and types of existing signs (e.g., the signs 416A-B) on the road 404. The computing device further may be configured to determine a presence of a candidate construction zone sign (e.g., one or both of the construction zone signs 412A-B), which may be missing from the map information. In one example, the candidate construction zone sign being missing from the map information may be indicative of temporariness of the candidate construction zone sign, and thus may indicate that the candidate construction zone sign is likely a construction zone sign. Accordingly, the computing device may assign a respective likelihood that the candidate construction zone sign is associated with a construction zone. In an example, the computing device may be configured to update the map information to include respective sign information associated with the candidate construction zone sign and the likelihood of the existence of the construction zone on the road, so as to allow other vehicles or drivers on the road 404 to be cautious that there is a given likelihood of existence of a given construction zone on the road 404. The computing device also may be configured to use any of the techniques described below with regard to FIGS. 5 and 7 to detect and/or identify construction zone signs.

In still another example, the computing device may be configured to receive the traffic information indicative of behavior of the other vehicles 414A-B on the road 404. In this example, to determine the likelihood, the computing device may be configured to determine a change in nominal speed and flow of traffic of the other vehicles 414A-B based on the traffic information. The computing device may be configured to compare the change in behavior of the other vehicles 414A-B with a predetermined or typical pattern of traffic changes associated with approaching a given construction zone, and the computing device may be configured to determine the likelihood based on the comparison. In an example, the computing device, in determining the likelihood based on the comparison, may be configured to distinguish a given change in traffic associated with an accident site from a respective change in traffic associated with approaching a respective construction zone. For example, an accident site may be characterized by a congestion point towards which vehicles may slow down and accelerate once the congestion point is passed; alternatively, construction zones may be characterized by a longer road section of changed speed and flow of traffic. In another example, the computing device may be configured to distinguish an accident site from a construction zone based on accident information received from an accident broadcasting service.

In one example, the computing device may be configured to assign or determine a respective likelihood of existence of the construction zone for each type or source of information (e.g., the image-based information, LIDAR-based information, RADAR-based information, the map information, and the traffic information) and further may be configured to determine a single likelihood based on a combination of the respective likelihoods (e.g., a weighted combination of the respective likelihoods). For instance, the respective likelihood assigned to each source of information of the plurality of sources of information may be based on the reliability metric assigned to that source of information. Also, in an example, based on a respective likelihood determined for a source of the plurality of sources of information, the computing device may be configured to enable a sensor or module coupled to the vehicle 402 to receive information from another source of information to confirm existence of the construction zone.

In another example, the computing device may be configured to generate a probabilistic model (e.g., a Gaussian distribution), based on the information relating to detection of the construction zone received from the plurality of sources and the respective reliability metrics assigned to the plurality of sources, to determine the likelihood of the existence of the construction zone. For example, the likelihood of the existence of the construction zone may be determined as a function of a set of parameter values that are determined based on the information from the plurality of sources and the respective reliability metrics. In this example, the likelihood may be defined as equal to probability of an observed outcome (the existence of the construction zone) given those parameter values. Those skilled in the art will appreciate that determining the likelihood function may involve distinguishing between discrete probability distribution, continuous probability distribution, and mixed continuous-discrete distributions, and that several types of likelihood exist such as log likelihood, relative likelihood, conditional likelihood, marginal likelihood, profile likelihood, and partial likelihood.

In still another example, the computing device may be configured to process the information from the plurality of sources and the respective reliability metrics through a classifier to determine the likelihood. The classifier can be defined as an algorithm or mathematical function implemented by a classification algorithm that maps input information (e.g., the information relating to detection of the construction zone and the respective reliability metrics) to a class (e.g., existence of the construction zone).

Classification may involve identifying to which of a set of classes (e.g., existence or nonexistence of the construction zone) a new observation may belong, on the basis of a training set of data containing observations (or instances) with a known class. The individual observations may be analyzed into a set of quantifiable properties, known as various explanatory variables or features. As an example, classification may include assigning a respective likelihood to "existence of construction zone" or "nonexistence of construction zone" classes as indicated by received information relating to detection of the construction zone (e.g., image-based information, LIDAR-based information, RADAR-based information, map information, traffic information, etc.).

In one example, the classification may include a probabilistic classification. Probabilistic classification algorithms may output a probability of an instance (e.g., a driving situation or a group of observations indicated by the received information relating to the detection of the construction zone) being a member of each of the possible classes: "existence of construction zone" or "nonexistence of construction zone". Determining likelihood of the existence of the construction zone may be based on probability assigned to each class. Also, the probabilistic classification can output a confidence value associated with the existence of the construction zone.

Example classification algorithms may include Linear classifiers (e.g., Fisher's linear discriminant, logistic regression, naive Bayes, and perceptron), Support vector machines (e.g., least squares support vector machines), quadratic classifiers, kernel estimation (e.g., k-nearest neighbor), boosting, decision trees (e.g., random forests), neural networks, Gene Expression Programming, Bayesian networks, hidden Markov models, and learning vector quantization. Other example classifiers are also possible.

As an example for illustration, a linear classifier may be expressed as a linear function that assigns a score or likelihood to each possible class k (e.g., "existence of construction zone" or "nonexistence of construction zone") by combining a feature vector (vector of parameters associated with the information relating to the detection of the construction zone and received from the plurality of sources and the respective reliability metrics) of an instance (e.g., a driving situation) with a vector of weights, using a dot product. Class with the higher score or likelihood may be selected as a predicted class. This type of score function is known as a linear predictor function and may have this general form:

$$\text{Score}(X_i, k) = \beta_k \cdot X_i \qquad \text{Equation (1)}$$

where $X_i$ is the feature vector for instance i, $\beta_k$ is a vector of weights corresponding to category k, and score($X_i$, k) is the score associated with assigning instance i to category k.

As an example, a training computing device may be configured to receive training data for a plurality of driving situations of a given vehicle. For example, for each of the plurality of driving situations, respective training data may include respective image-based information, respective LIDAR-based information, respective RADAR-based information, respective traffic information, and respective map information. Also, the training computing device may be configured to receive positive or negative indication of existence of a respective construction zone corresponding to the respective training data for each of the driving situations. Further the training computing device may be configured to correlate, for each driving situation, the positive or negative indication with the respective training data; and determine parameters (e.g., vector of weights for equation 1) of the classifier based on the correlations for the plurality of driving situations. Further, in an example, the training computing device may be configured to determine a respective reliability metric for each source of information based on the correlation. The parameters and respective reliability metrics of the plurality of sources of information may be provided to the computing device configured to control the vehicle 402 such that as the computing device receives the information, from the plurality of sources of information, relating to the detection of the construction zone, the computing device may be configured to process the information through the classifier using the determined parameters of the classifier to determine the likelihood.

In one example, the likelihood may be qualitative such as "low," "medium," or "high" or may be numerical such as a number on a scale, for example. Other examples are possible.

Referring back to FIG. 3, at block 306, the method 300 includes modifying, using the computing device, a control strategy associated with a driving behavior of the vehicle, based on the likelihood.

The control system of the vehicle may support multiple control strategies and associated driving behaviors that may be predetermined or adaptive to changes in a driving environment of the vehicle. Generally, a control strategy may comprise sets of rules associated with traffic interaction in various driving contexts such as approaching a construction zone. The control strategy may comprise rules that determine a speed of the vehicle and a lane that the vehicle may travel on while taking into account safety and traffic rules and concerns (e.g., changes in road geometry due to existence of a construction zone, vehicles stopped at an intersection and windows-of-opportunity in yield situation, lane tracking, speed control, distance from other vehicles on the road, passing other vehicles, and queuing in stop-and-go traffic, and avoiding areas that may result in unsafe behavior such as oncoming-traffic lanes, etc.). For instance, in approaching a construction zone, the computing device may be configured to modify or select, based on the determined likelihood of the existence of the construction zone, a control strategy comprising rules for actions that control the vehicle speed to safely maintain a distance with other objects and select a lane that is considered safest given road changes due to the existence of the construction zone.

As an example, in FIG. 4, if the likelihood of the existence of the construction zone is high (e.g., exceeds a predetermined threshold), the computing device may be configured to utilize sensor information, received from on-board sensors on the vehicle 402 or off-board sensors in communication with the computing device, in making a navigation decision rather than preexisting map information that may not include information and changes relating to the construction zone. Also, the computing device may be configured to utilize the sensor information rather than the preexisting map information to estimate lane boundaries. For example, referring to FIG. 4, the computing device may be configured to determine locations of construction zone markers (e.g., the construction zone cone(s) 406) rather than lane markers 418 on the road 404 to estimate and follow the lane boundaries. As another example, the computing device may be configured to activate one or more sensors for detection of construction workers 420 and making the navigation decision based on the detection.

In an example, a first control strategy may comprise a default driving behavior and a second control strategy may comprise a defensive driving behavior. Characteristics of a the defensive driving behavior may comprise, for example, following a vehicle of the vehicles 414A-B, maintaining a predetermined safe distance with the vehicles 414A-B that may be larger than a distance maintained in the default driving behavior, turning-on lights, reducing a speed of the vehicle 402, and stopping the vehicle 402. In this example, the computing device of the vehicle 402 may be configured to compare the determined likelihood to a threshold likelihood, and the computing device may be configured to select the first or the second control strategy, based on the comparison. For example, if the determined likelihood is greater than the threshold likelihood, the computing device may be configured to select the second driving behavior (e.g., the defensive driving behavior). If the determined likelihood is less than the threshold likelihood, the computing device may be configured to modify the control strategy to the first control strategy (e.g., select the default driving behavior).

In yet another example, alternatively or in addition to transition between discrete control strategies (e.g., the first control strategy and the second control strategy) the computing device may be configured to select from a continuum of driving modes or states based on the determined likelihood. In still another example, the computing device may be configured to select a discrete control strategy and also may be configured to select a driving mode from a continuum of driving modes within the selected discrete control strategy. In this example, a given control strategy may comprise multiple sets of driving rules, where a set of driving rules describe actions for control of speed and direction of the vehicle 402. The computing device further may be configured to cause a smooth transition from a given set of driving rules to another set of driving rules of the multiple sets of driving rules, based on the determined likelihood. A smooth transition may indicate that the transition from the given set of rules to another may not be perceived by a passenger in the vehicle 402 as a sudden or jerky change in a speed or direction of the vehicle 402, for example.

In an example, a given control strategy may comprise a program or computer instructions that characterize actuators controlling the vehicle 402 (e.g., throttle, steering gear, brake, accelerator, or transmission shifter) based on the determined likelihood. The given control strategy may include action sets ranked by priority, and the action sets may include alternative actions that the vehicle 402 may take to accomplish a task (e.g., driving from one location to another). The alternative actions may be ranked based on the determined likelihood, for example. Also, the computing device may be configured to select an action to be performed and, optionally, modified based on the determined likelihood.

In another example, multiple control strategies (e.g., programs) may continuously propose actions to the computing device. The computing device may be configured to decide which strategy may be selected or may be configured to modify the control strategy based on a weighted set of goals (safety, speed, etc.), for example. Weights of the weighted set of goals may be a function of the determined likelihood. Based on an evaluation of the weighted set of goals, the computing device, for example, may be configured to rank the multiple control strategies and respective action sets and select or modify a given strategy and a respective action set based on the ranking.

These examples and driving situations are for illustration only. Other examples and control strategies and driving behaviors are possible as well.

Referring back to FIG. 3, at block 308, the method 300 includes controlling, using the computing device, the vehicle based on the modified control strategy. In an example, the computing device may be configured to control actuators of the vehicle using an action set or rule set associated with the modified control strategy. For instance, the computing device may be configured to adjust translational velocity, or rotational velocity, or both, of the vehicle based on the modified driving behavior.

As an example, in FIG. 4, controlling the vehicle 402 may comprise determining a desired path of the vehicle, based on the likelihood. In one example, the computing device may have determined a high likelihood that a construction zone exists on the road 404 on which the vehicle 402 is travelling. In this example, the computing device may be configured to take into account lane boundary indicated by the lane markers 418 on the road 404 as a soft constraint (i.e., the lane boundary can be violated if a safer path is determined) when determining the desired path. The computing device thus may be configured to determine a number and locations of the construction zone cone(s) 406 that may form a modified lane boundary; and may be configured to adhere to the modified lane boundary instead of the lane boundary indicated by the lane markers 418.

As shown in FIG. 4, the vehicle 402 may be approaching the construction zone on the road 404, and the computing device may be configured to control the vehicle 402 according to a defensive driving behavior to safely navigate the construction zone. For example, the computing device may be configured to reduce speed of the vehicle 402, cause the vehicle 402 to change lanes and adhere to the modified lane boundary formed by the construction zone cone(s) 406, shift to a position behind the vehicle 414A, and follow the vehicle 414A while keeping a predetermined safe distance.

In one example, in addition to determining the likelihood of the existence of the construction zone, the computing device may be configured to determine or estimate a severity of changes to the road 404 due to the existence of the construction zone. The computing device may be configured to modify the control strategy further based on the severity of the changes. As an example, in FIG. 4, the computing device may be configured to determine, based on the construction equipment 410A-B, number and locations of the construction zone cone(s) 406 and barrel(s) 408, how severe the changes (e.g., lane closure, shifts, etc.) to the road 404 are, and control the vehicle 402 in accordance with the defensive driving behavior. In another example, the construction zone may comprise less severe changes. For example, the construction zone may comprise a worker that may be painting on a curb lane on a side of the road 404. In this example, changes to the road 404 may be less severe than changes depicted in FIG. 4, and the computing device may be configured to reduce the speed of the vehicle 402 as opposed to stop the vehicle 402 or cause the vehicle 402 to change lanes, for example.

These control actions and driving situations are for illustration only. Other actions and situations are possible as well. In one example, the computing device may be configured to control the vehicle based on the modified control strategy as an interim control until a human driver can take control of the vehicle.

As described above with respect to FIGS. 3 and 4, the computing device may be configured to determine the likelihood of the existence of the construction zone based on identification or detection of a construction zone sign (e.g., the construction zone sign 412A) that may be indicative of the construction zone.

Figure 5:
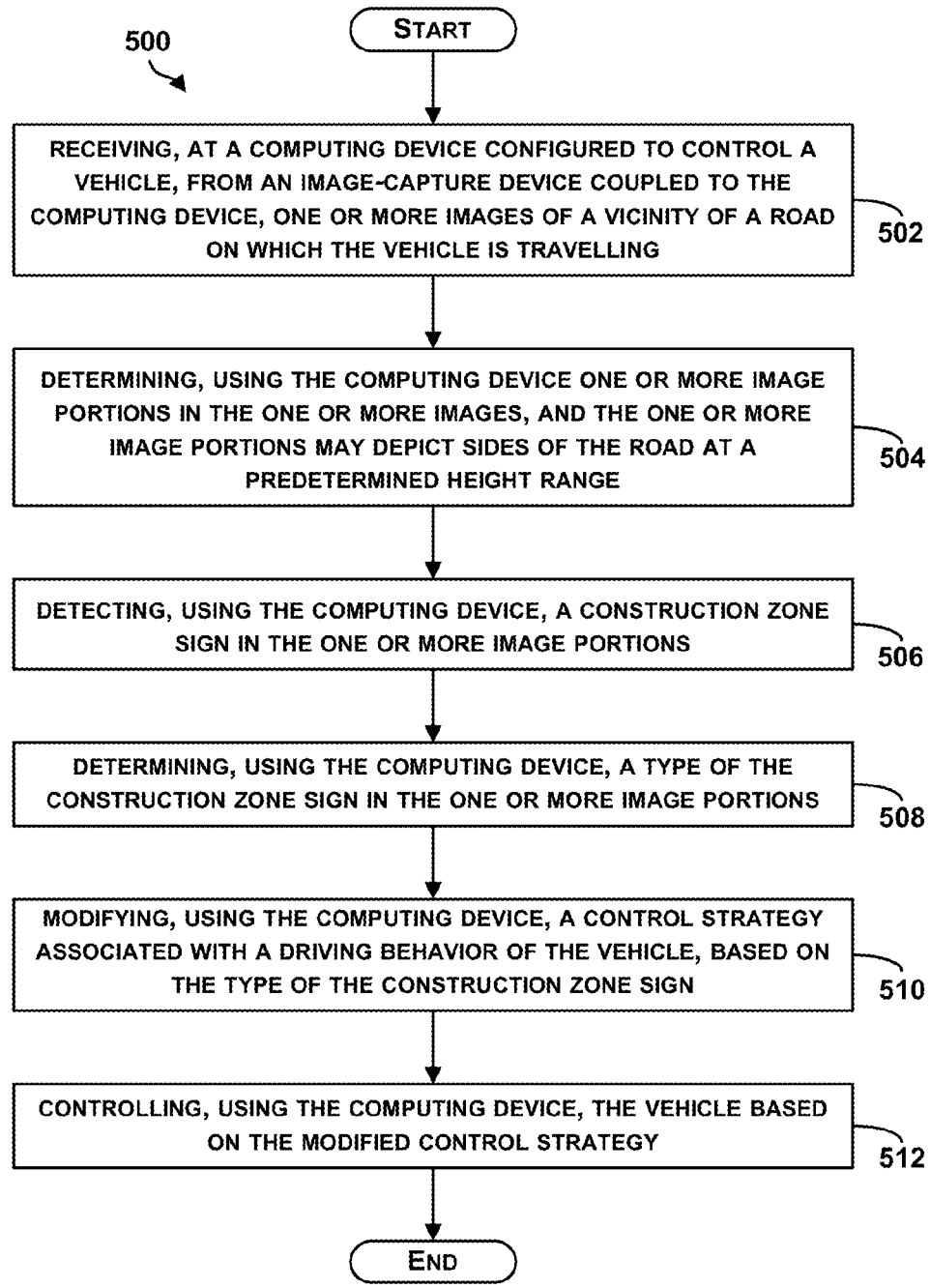
FIG. 5 is a flow chart of a method for detection of a construction zone sign, in accordance with an example embodiment.
Figure 6A:
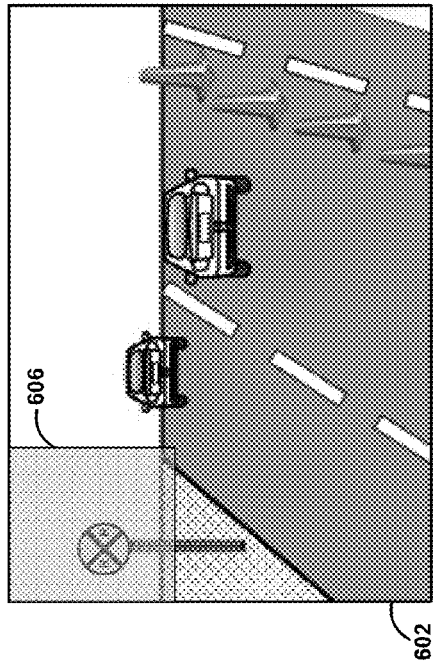
FIGS. 6A-6B illustrate images of a road and vicinity of the road the vehicle is travelling on, in accordance with an example embodiment.
Figure 6B:
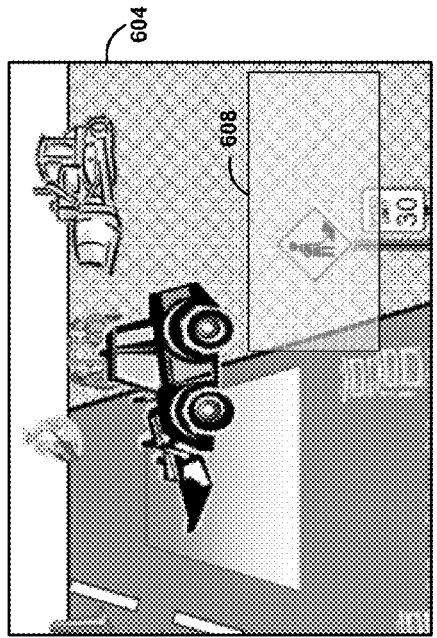
Figure 6C:
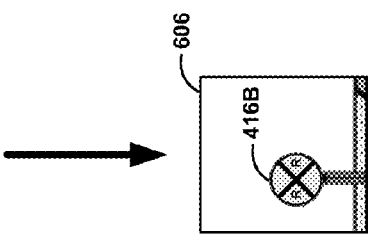
FIGS. 6C-6D illustrate portions of the images of the road and the vicinity of the road depicting sides of the road at a predetermined height range, in accordance with an example embodiment.
Figure 6D:
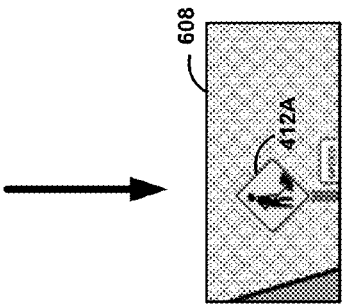

FIG. 5 is a flow chart of a method 500 for detection of a construction zone sign, in accordance with an example embodiment. FIGS. 6A-6B illustrate images of a road and vicinity of the road the vehicle is travelling on, in accordance with an example embodiment, and FIGS. 6C-6D illustrate portions of the images of the road and the vicinity of the road depicting sides of the road at a predetermined height range, in accordance with an example embodiment. FIGS. 5 and 6A-6D will be described together.

The method 500 may include one or more operations, functions, or actions as illustrated by one or more of blocks 502-512. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 502, the method 500 includes receiving, at a computing device configured to control a vehicle, from an image-capture device coupled to the computing device, one or more images of a vicinity of a road on which the vehicle is travelling. The computing device may be onboard the vehicle or may be off-board but in wireless communication with the vehicle, for example. Also, the computing device may be configured to control the vehicle in an autonomous or semi-autonomous operation mode. Further, an image-capture device (e.g., the camera 134 in FIG. 1 or the camera 210 in FIG. 2) may be coupled to the vehicle and in communication with the computing device. The image-capture device may be configured to capture images or video of the road and vicinity of the road on which the vehicle is travelling on.

FIGS. 6A-6B, for example, illustrate example images 602 and 604, respectively, captured by the image-capture device coupled to the vehicle 402 in FIG. 4. In an example, the image-capture device may be configured to continuously capture still images or a video from which the still images can be extracted. In one example, one or more image-capture devices may be coupled to the vehicle 402; the one or more image-capture devices may be configured to capture the images from multiple views to take into account surroundings of the vehicle 402 and road condition from all directions.

Referring back to FIG. 5, at block 504, the method 500 includes determining, using the computing device, one or more image portions in the one or more images, and the one or more image portions may depict sides of the road at a predetermined height range. In some examples, the predetermined height range may correspond to a height range that is typically used for construction zone signs. In many jurisdictions, construction zones on roads are regulated by standard specifications and rules, which may be used to define the predetermined height range. An example rule may state that a construction zone sign indicating existence of a construction zone on the road may be placed at a given location continuously for longer than three days and may be mounted on a post on a side of the road. Further, another rule may specify that a minimum sign mounting height for a temporary warning construction zone sign, for example, may be 1 foot above road ground level. In other examples, in addition to or alternative to the minimum sign mounting height, a height range can be specified, i.e., a height range for a temporary warning construction zone sign may be between 1 foot and 6 feet, for example. In some locations where the construction zone sign may be located behind a traffic control device such as a traffic safety drum or temporary barrier, the minimum height may be raised to 5 feet in order to provide additional visibility. Additionally or alternatively, a height range can be specified to be between 5 feet and 11 feet, for example. These numbers and rules are for illustration only. Other standards and rules are possible. In some examples, the predetermined height range or minimum height of a typical construction zone sign may be dependent on location (e.g., geographic region, which state in the United States of America, country, etc.).

The computing device may be configured to determine portions, in the images captured by the image-capture device, which may depict road sides at the predetermined height range of a typical construction zone sign according to the standard specifications. As an example, in FIG. 6A, the computing device may be configured to determine a portion 606 in the image 602 depicting a side of the road 404 at a predetermined height range specified for typical construction zone signs according to the standard specifications. Similarly, in FIG. 6B, the computing device may be configured to determine a portion 608 in the image 604 depicting another side of the road 404 at the predetermined height range. FIG. 6C illustrates the image portion 606 of the image 602 illustrated in FIG. 6A, and FIG. 6D illustrates the image portion 608 of the image 604 illustrated in FIG. 6B.

Referring back to FIG. 5, at block 506, the method 500 includes detecting, using the computing device, a construction zone sign in the one or more image portions. The standard specifications also may include rules for shape, color, pattern, and retroreflective characteristics of typical construction zone signs. As an example for illustration, the standard specifications may specify that a typical construction zone sign may be a 48 inches×48 inches diamond shape with black letters of symbols on an orange background having a standard type of reflective sheeting. These specifications are for illustration only, and other specifications are possible.

As an example, referring to FIGS. 6A-6D, the computing device may be configured to detect candidate construction zone signs, such as the sign 412A and the sign 416B in the image portions 608 and 606, respectively. The computing device further may be configured to determine, using image recognition techniques known in the art for example, whether a candidate construction zone sign relates to a construction zone, based on one or more of the shape, color, pattern, and reflective characteristics of the candidate construction zone sign as compared to the standard specifications of typical construction zone signs. For example, the computing device may be configured, based on the comparison, to determine that the sign 412A is a construction zone sign, while the sign 416B is not.

In an example to illustrate use of image recognition, the computing device may be configured to compare an object detected, in the one or more image portions, to a template of the typical construction zone sign. For example, the computing device may be configured to identify features of the object such as color, shape, edges, and corners of the object in the one or more image portions. Then, the computing device may be configured to compare these features to orange/yellow color, diamond shape with sharp edges, and corners (i.e., "corner signature") of the typical construction zone sign. The computing device may be configured to process the features (e.g., color, shape, etc.) or parameters representative of the features of the object through a classifier to determine whether the features of the object match typical features of the typical construction zone sign. The classifier can map input information (e.g., the features of the object) to a class (e.g., the object represents a construction zone sign). Examples of classifiers, training data, and classification algorithms are described above with regard to block 304 of the method 300 illustrated in FIG. 3.

In an example, the computing device may be configured to use information received from other sensors or units coupled to the vehicle 402, in addition to image-based information received from the image-capture device, to confirm or validate detection of a construction zone sign. For example, the computing device may be configured to assign or determine, based on the image-based information, a first likelihood that a candidate construction zone sign in the image portions relates to a construction zone. Further, the computing device may be configured to receive, from a LIDAR sensor (e.g., the LIDAR unit 132 in FIG. 1) coupled to the vehicle 402 and in communication with the computing device, LIDAR-based information that includes a 3D point cloud corresponding to the image portions (e.g., the image portion 608) depicting the candidate construction zone sign (e.g., the sign 412A). The 3D point cloud may comprise a set of points based on light emitted from the LIDAR and reflected from a surface of the candidate construction zone sign. The computing device may be configured to determine a second likelihood that the candidate construction zone sign relates to the construction zone, based on the LIDAR-based information, and confirm existence or detection of the construction zone sign based on the first likelihood and the second likelihood.

In another example, in addition to or alternative to receiving the LIDAR-based information, the computing device may be configured to receive, from a RADAR sensor (e.g., the RADAR unit 130 in FIG. 1) coupled to the computing device, RADAR-based information relating to location and characteristics of the candidate construction zone sign. The RADAR sensor may be configured to emit radio waves and receive back the emitted radio waves that bounced off the surface of the candidate construction zone sign. The received signals or RADAR-based information may be indicative, for example, of dimensional characteristics of the candidate construction zone sign, and may indicate that the candidate construction zone sign is stationary. The computing device may be configured to determine a third likelihood that the candidate construction zone sign relates to the construction zone, based on the RADAR-based information, e.g., based on a comparison of the characteristics of the candidate construction zone sign to standard characteristics of a typical construction zone sign. Further, the computing device may be configured to detect the construction zone sign based on the first likelihood, the second likelihood, and the third likelihood.

As an example, the computing device may be configured to determine an overall likelihood that is a function of the first likelihood, the second likelihood, and the third likelihood (e.g., a weighted combination of the first likelihood, the second likelihood, and the third likelihood), and the computing device may be configured to detect the construction zone sign based on the overall likelihood.

In one example, the computing device may be configured to detect the construction zone sign based on information received from a plurality of sources of information such as the image-capture device, the LIDAR sensor, and the RADAR sensor; but, in another example, the computing device may be configured to detect the construction zone sign based on a subset of information received from a subset of the plurality of sources. For example, images captured by the image-capture device may be blurred due to a malfunction of the image-capture device. As another example, details of the road 404 may be obscured in the images because of fog. In these examples, the computing device may be configured to detect the construction zone sign based on information received from the LIDAR and/or RADAR units and may be configured to disregard the information received from the image-capture device.

In another example, the vehicle 402 may be travelling in a portion of the road 404 where some electric noise or jamming signals may exist, and thus the LIDAR and/or RADAR signals may not operate correctly. In this case, the computing device may be configured to detect the construction zone sign based on information received from the image-capture device, and may be configured to disregard the information received from the LIDAR and/or RADAR units.

In one example, the computing device may be configured to rank the plurality of sources of information based on a condition of the road 404 (e.g., fog, electronic jamming, etc.) and/or based on the respective reliability metric assigned to each source of the plurality of sources. The ranking may be indicative of which sensor(s) to rely on or give more weight to in detecting the construction zone sign. As an example, if fog is present in a portion of the road, then the LIDAR and RADAR sensors may be ranked higher than the image-based device, and information received from the LIDAR and/or RADAR sensor may be given more weight than respective information received from the image-capture device.

Referring back to FIG. 5, at block 508, the method 500 includes determining, using the computing device, a type of the construction zone sign in the one or more image portions. Various types of construction zone signs may exist. One construction zone sign type may be related to regulating speed limits when approaching and passing through a construction zone on a road. Another construction zone sign type may be related to lane changes, closure, reduction, merger, etc. Still another construction zone sign type may be related to temporary changes to direction of travel on the road. Example types of construction zone signs may include: "Right Lane Closed Ahead," "Road Work Ahead," "Be Prepared to Stop," "Road Construction 1500 ft," "One Lane Road Ahead," "Reduced Speed Limit 30," "Shoulder Work," etc. Other example types are possible.

In an example, the computing device of the vehicle may be configured to determine a type of the detected construction zone based on shape, color, typeface of words, etc. of the construction zone sign. As an example, the computing device may be configured to use image recognition techniques to identify the type (e.g., shape of, or words written on, the construction zone sign) from an image of the detected construction zone sign.

As described above with respect to block 506, the computing device may be configured to utilize image recognition techniques to compare an object to a template of a typical construction zone sign to detect a construction zone sign. In an example, to determine the type of the detected construction zone sign, the computing device may be configured to compare portions of the detected construction zone sign to sub-templates of typical construction zone signs. In one example, the computing device may be configured to identify individual words or characters typed on the detected construction zone sign, and compare the identified words or characters to corresponding sub-templates of typical construction zone signs. In another example, the computing device may be configured to determine spacing between the characters or the words, and/or spacing between the words and edges of the detected construction zone sign. In still another example, the computing device may be configured to identify a font in which the words or characters are printed on the detected construction zone sign and compare the identified font to fonts sub-template associated with typical construction zone signs.

As an example, the computing device may be configured to detect a construction zone sign having the words "Road Work Ahead" typed on the detected construction zone sign. The computing device may be configured to extract individual characters or words "Road," "Work," "Ahead," in the one or more image portions, and compare these words and characteristics of these words (e.g., fonts, letter sizes, etc.) to corresponding sub-templates typical construction zone signs. Also, the computing device may be configured to compare spacing between the three words and spacing between letters forming the words to corresponding sub-templates. Further, the computing device may be configured to compare spacing between the word "Road" and a left edge of the detected construction zone sign and the spacing between the word "Ahead" and a right edge of the detected construction zone sign to corresponding sub-templates. Based on these comparisons, the computing device may be configured to determine the type of the detected construction zone sign.

These features (e.g., characters, words, fonts, spacing, etc.) are examples for illustrations, and other features can be used and compared to typical features (i.e., sub-templates) of typical construction zone signs to determine the type of the detected construction zone sign.

In one example, in addition to or alternative to using image recognition, based on the RADAR-based information, the computing device may be configured to determine shape and dimensions of the construction zone sign and infer the type and associated road changes from the determined shape and dimensions. Other examples are possible.

At block 510, the method 500 includes modifying, using the computing device, a control strategy associated with a driving behavior of the vehicle, based on the type of the construction zone sign. The road changes due to existence of a construction zone on the road may be indicated by the type of the construction zone sign existing on ahead of the construction zone. The computing device may be configured to modify control strategy of the vehicle based on the determined type of the construction zone sign.

Examples of modifying the control strategy are described above with regard to block 306 of the method 300 illustrated in FIG. 3. As examples, the computing device may be configured to determine whether a lane shift and/or speed change are required as indicated by the type; utilize sensor information received from on-board or off-board sensors in making a navigation decision rather than preexisting map information; utilize the sensor information to estimate lane boundaries rather than the preexisting map information; determine locations of construction zone cones or barrels rather than lane markers on the road to estimate and follow the lane boundaries; and activate one or more sensors for detection of construction workers and making the navigation decision based on the detection. These examples and driving situations are for illustration only. Other examples and control strategies and driving behaviors are possible as well.

At block 512, the method 500 includes controlling, using the computing device, the vehicle based on the modified control strategy. Examples of controlling the vehicle based on the modified control strategy are described above with regard to block 308 of the method 300 illustrated in FIG. 3. As examples, the computing device may be configured to adjust translational velocity, or rotational velocity, or both, of the vehicle based on the modified driving behavior in order to follow another vehicle; maintain a predetermined safe distance with other vehicles; turn-on lights; reduce a speed of the vehicle; shift lanes; and stop the vehicle. These control actions and driving situations are for illustration only. Other actions and situations are possible as well.

As described with respect to block 506 of the method 500 illustrated in FIG. 5, the computing device may be configured to detect or confirm detection of the construction zone sign based on information received from a LIDAR sensor coupled to the vehicle and in communication with the computing device.

Figure 7:
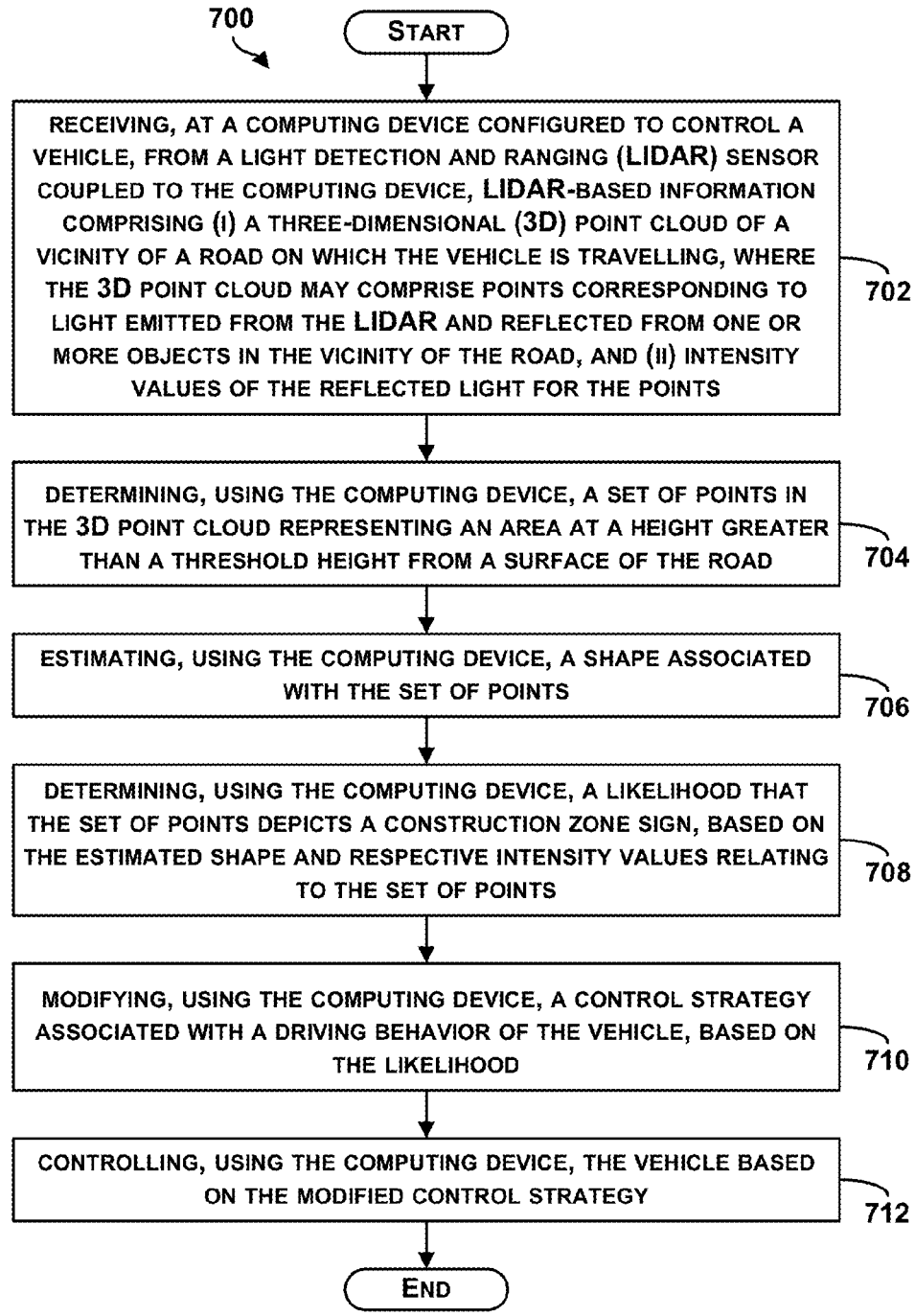
FIG. 7 is a flow chart of a method for detection of the construction zone sign using LIDAR-based information, in accordance with an example embodiment.

FIG. 7 is a flow chart of a method 700 for detection of the construction zone sign using LIDAR-based information, in accordance with an example embodiment. FIG. 8A illustrates LIDAR-based detection of the construction zone sign at a height greater than a threshold height from a surface of the road, in accordance with an example embodiment. FIG. 8B illustrates a LIDAR-based image depicting the area at the height greater than the threshold height from the surface of the road, in accordance with an example embodiment. FIGS. 7 and 8A-8B will be described together.

The method 700 may include one or more operations, functions, or actions as illustrated by one or more of blocks 702-712. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 702, the method 700 includes receiving, at a computing device configured to control a vehicle, from a light detection and ranging (LIDAR) sensor coupled to the computing device, LIDAR-based information comprising (i) a three-dimensional (3D) point cloud of a vicinity of a road on which the vehicle is travelling, where the 3D point cloud may comprise points corresponding to light emitted from the LIDAR and reflected from one or more objects in the vicinity of the road, and (ii) intensity values of the reflected light for the points. A LIDAR sensor or unit (e.g., the LIDAR unit 132 in FIG. 1) may be coupled to the vehicle and in communication with the computing device configured to control the vehicle. As described with respect to the LIDAR unit 132 in FIG. 1, LIDAR operation may involve an optical remote sensing technology that enables measuring properties of scattered light to find range and/or other information of a distant target. The LIDAR sensor/unit, for example, may be configured to emit laser pulses as a beam, and scan the beam to generate two dimensional or three dimensional range matrices. In an example, the range matrices may be used to determine distance to an object or surface by measuring time delay between transmission of a pulse and detection of a respective reflected signal.

In another example, the LIDAR sensor may be configured to rapidly scan an environment surrounding the vehicle in three dimensions. In some examples, more than one LIDAR sensor may be coupled to the vehicle to scan a complete 360° horizon of the vehicle. The LIDAR sensor may be configured to provide to the computing device a cloud of point data representing objects, which have been hit by the laser, on the road and the vicinity of the road. The points may be represented by the LIDAR sensor in terms of azimuth and elevation angles, in addition to range, which can be converted to (X, Y, Z) point data relative to a local coordinate frame attached to the vehicle. Additionally, the LIDAR sensor may be configured to provide to the computing device intensity values of the light or laser reflected off the objects.

At block 704, the method 700 includes determining, using the computing device, a set of points in the 3D point cloud representing an area at a height greater than a threshold height from a surface of the road. As described with respect to the method 500, construction zones on roads may be regulated by standard specifications and rules. A minimum sign mounting height may be specified for a typical construction zone sign, for example. FIG. 8A illustrates the vehicle 402 travelling on the road 404 and approaching a construction zone indicated by the construction zone sign 412A. The LIDAR sensor coupled to the vehicle 402 may be scanning the horizon and providing the computing device with a 3D point cloud of the road 404 and a vicinity (e.g., sides) of the road 404. Further, the computing device may be configured to determine an area 802 at a height greater than a threshold height 804; the threshold height 804 may be the minimum sign mounting height specified for a typical construction zone sign according to the standard specifications of construction zones, for example. FIG. 8B illustrates a LIDAR-based image 806 including a set of points (e.g., a subset of the 3D point cloud) representing or corresponding to the determined area 802.

Referring back to FIG. 7, at block 706, the method 700 includes estimating, using the computing device, a shape associated with the set of points. The computing device may be configured to identify or estimate a shape depicted by the set of points representing the area at the height greater than the threshold height. For example, the computing device may be configured to estimate dimensional characteristics of the shape. In an example, the computing device may be configured to fit a predetermined shape to the shape depicted in the set of point to estimate the shape. As an example, in FIG. 8B, the computing device may be configured to estimate a diamond shape 808 in the set of point included in the LIDAR-based image 806.

Referring back to FIG. 7, at block 708, the method 700 includes determining, using the computing device, a likelihood that the set of points depicts a construction zone sign, based on the estimated shape and respective intensity values relating to the set of points. In an example, referring to FIG. 8B, the computing device may be configured to match or compare the estimated shape 808 to one or more shapes of typical construction zone signs; and the computing device may be configured to determine a match metric indicative of how similar the estimated shape 808 is to a given predetermined shape (e.g., a percentage of match between dimensional characteristics of the estimated shape 808 and a diamond shape of a typical construction zone sign). In one example, the computing device may be configured to identify edges of the estimated shape 808 and match a shape formed by the edges to a typical diamond shape of typical construction zone signs. The likelihood may be determined based on the match metric, for example.

Further, typical construction zone signs may be required by the standard specifications of construction zones to be made of a retroreflective sheeting materials such as glass beads or prisms, and the computing device may be configured to compare intensity values of points forming the estimated shaped 808 to a threshold intensity value of the retroreflective sheeting material. Based on the comparison, the computing device may be configured to confirm that the estimated shape 808 may represent a given construction zone sign. For example, if the intensity values are close to or within a predetermined value of the threshold intensity value, the computing device may be configured to determine a high likelihood that that the estimated shape 808 may represent a construction zone sign.

In an example, the computing device may be configured to determine a first likelihood based on a comparison of the estimated shape 808 to a predetermined shape of a typical construction zone sign, and may be configured to determine a second likelihood based on a comparison of the intensity values to the threshold intensity value. The computing device may be configured to combine the first likelihood and the second likelihood to determine a single likelihood that the set of points, which includes the points forming the estimated shape 808, depicts a construction zone sign.

In another example, the computing device may be configured to generate a probabilistic model (e.g., a Gaussian distribution), based on the estimated shape 808 (e.g., dimensional characteristics of the estimate shape 808) and the intensity values, to determine the likelihood that the set of points depicts a construction zone sign. For example, the likelihood may be determined as a function of a set of parameter values that are determined based on dimensions of the estimated shape 808 and the respective intensity values. In this example, the likelihood may be defined as equal to probability of an observed outcome (the estimated shape 808 represents a construction zone sign) given those parameter values.

In still another example, the computing device may be configured to cluster points (e.g., the points forming the estimated shape 808) depicted in the LIDAR-based image 806 together into a cluster, based on locations of the points or relative locations of the points to each other. The computing device further may be configured to extract from the cluster of points a set of features (e.g., dimensional characteristics of the estimated shape 808, and the intensity values of the points forming the estimated shape 808). The computing device may be configured to process this set of features through a classifier to determine the likelihood. The classifier can map input information (e.g., the set of features extracted from the cluster of points) to a class (e.g., the cluster represents a construction zone sign). Examples of classifiers, training data, and classification algorithms are described above with regard to block 304 of the method 300 illustrated in FIG. 3.

In one example, the likelihood may be qualitative such as "low," "medium," "high" or may be numerical such as a number on a scale, for example. Other examples are possible.

Referring back to FIG. 7, at block 710, the method 700 includes modifying, using the computing device, a control strategy associated with a driving behavior of the vehicle, based on the likelihood. Based on the likelihood (e.g., the likelihood exceeds a predetermined threshold), the computing device may be configured to determine existence of a construction zone sign indicative of an approaching construction zone. Further, the computing device may be configured to determine a type of the construction zone sign to determine severity of road changes due to existence of the construction zone on the road. For example, the computing device may be configured to modify control strategy of the vehicle based on the determined type of the construction zone sign.

As described above with respect to block 508 of the method 500 in FIG. 5, various types of construction zone signs may exist to regulate speed limits when approaching and passing through the construction zone, describe lane changes, closure, reduction, merger, etc., and describe temporary changes to direction of travel on the road, for example. The computing device of the vehicle may be configured to determine the type of the detected construction zone sign based on shape, color, typeface of words, etc. of the detected construction zone sign.

Examples of modifying the control strategy are described above with regard to block 306 of the method 300 illustrated in FIG. 3.

At block 712, the method 700 includes controlling, using the computing device, the vehicle based on the modified control strategy. Controlling the vehicle may include adjusting translational velocity, or rotational velocity, or both, of the vehicle based on the modified driving behavior. Examples of controlling the vehicle based on the modified control strategy are described above with regard to block 308 of the method 300 illustrated in FIG. 3.

In addition to or alternative to detection of the construction zone sign using the LIDAR-based information, the computing device may be configured to detect construction zone objects (e.g., cones, barrels, equipment, vests, chevrons, etc.) using the LIDAR-based information.

Figure 9:
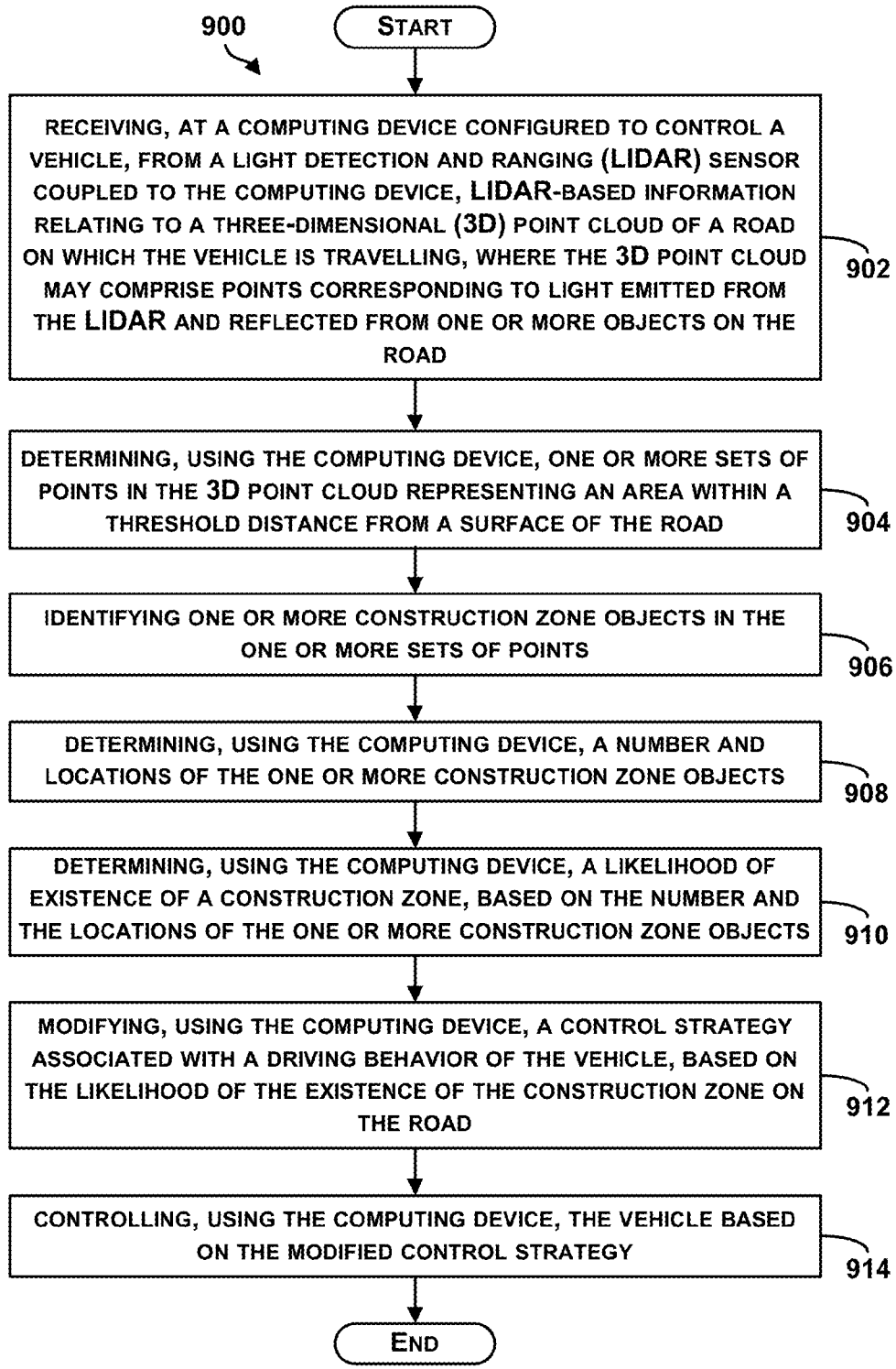
FIG. 9 is a flow chart of a method for detection of construction zone objects using LIDAR-based information, in accordance with an example embodiment.
Figure 10C:
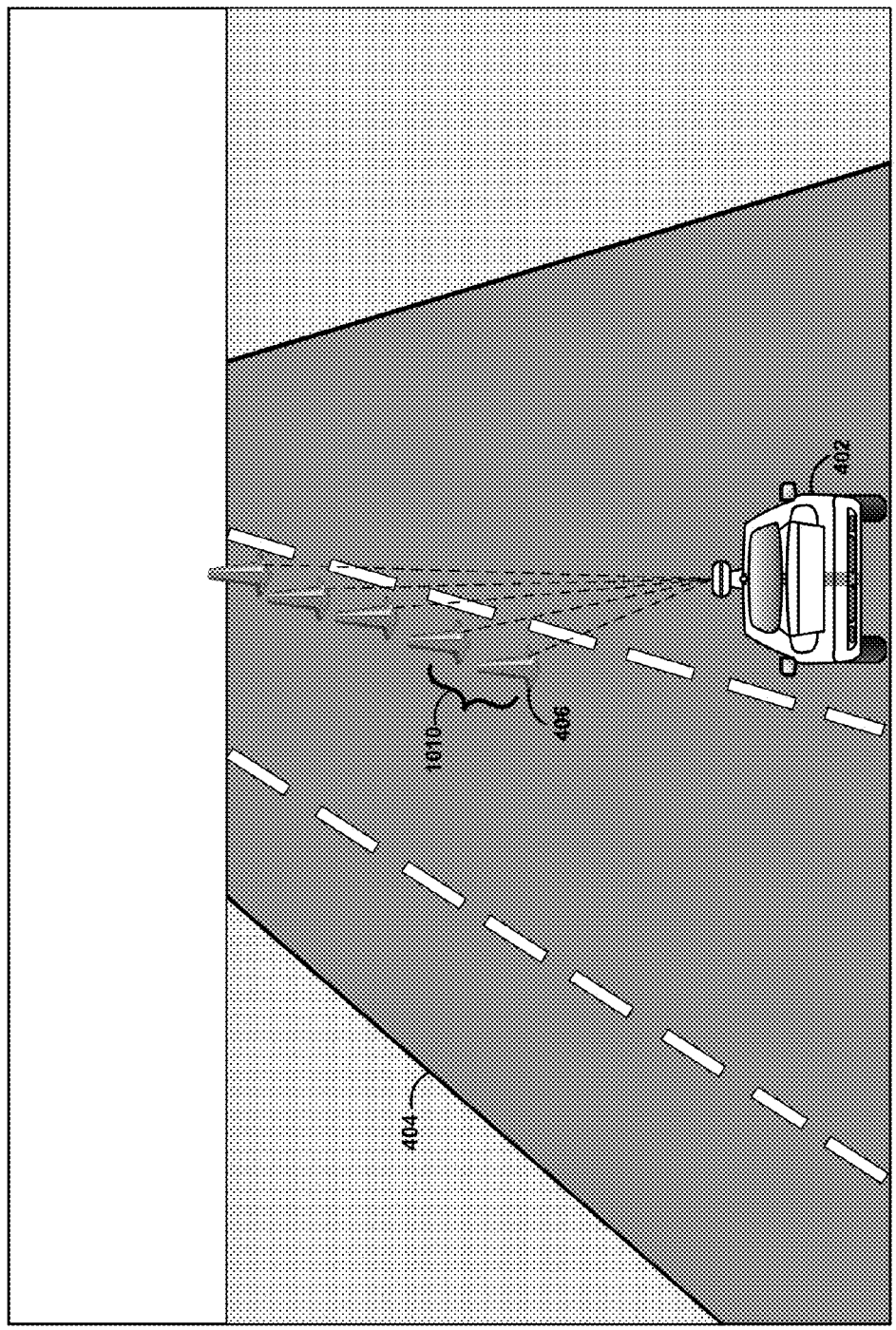
FIG. 10C illustrates LIDAR-based detection of construction zone cones forming a lane boundary, in accordance with an example embodiment.
Figure 10D:
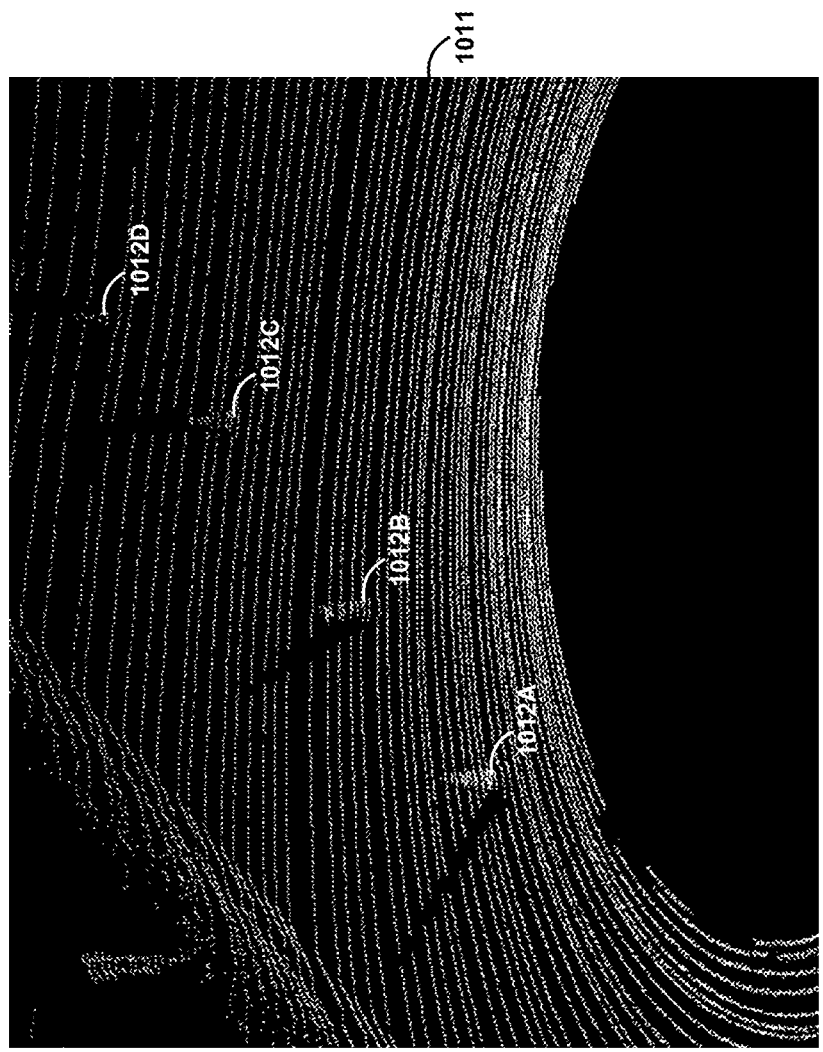
FIG. 10D illustrates a LIDAR-based image depicting construction zone cones forming a lane boundary, in accordance with an example embodiment.

FIG. 9 is a flow chart of a method for detection of construction zone objects using LIDAR-based information, in accordance with an example embodiment. FIG. 10A illustrates LIDAR-based detection of construction zone cones in an area within a threshold distance from a surface of the road, in accordance with an example embodiment. FIG. 10B illustrates a LIDAR-based image depicting the area within the threshold distance from the surface of the road, in accordance with an example embodiment. FIG. 10C illustrates LIDAR-based detection of construction zone cones forming a lane boundary, in accordance with an example embodiment. FIG. 10D illustrates a LIDAR-based image depicting construction zone cones forming a lane boundary, in accordance with an example embodiment. FIGS. 9 and 10A-10D will be described together. Detection of construction zone cones is used herein to illustrate the method 900; however, other construction zone objects (e.g., construction zone barrels, equipment, vests, chevrons, etc.) can be detected using the method 900 as well.

The method 900 may include one or more operations, functions, or actions as illustrated by one or more of blocks 902-914. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 902, the method 900 includes receiving, at a computing device configured to control a vehicle, from a light detection and ranging (LIDAR) sensor coupled to the computing device, LIDAR-based information relating to a three-dimensional (3D) point cloud of a road on which the vehicle is travelling, where the 3D point cloud may comprise points corresponding to light emitted from the LIDAR and reflected from one or more objects on the road. A LIDAR sensor or unit (e.g., the LIDAR unit 132 in FIG. 1) may be coupled to the vehicle and in communication with the computing device. As described above with respect to the LIDAR unit 132 in FIG. 1, and block 702 of the method 700 illustrated in FIG. 7, the LIDAR sensor may be configured to provide to the computing device a cloud of point data representing objects, on the road and the vicinity of the road. The points may be represented by the LIDAR sensor in terms of azimuth and elevation angles, in addition to range, which can be converted to (X, Y, Z) point data relative to a local coordinate frame attached to the vehicle.

At block 904, the method 900 includes determining, using the computing device, one or more sets of points in the 3D point cloud representing an area within a threshold distance from a surface of the road. As described above with respect to the methods 500 and 700, construction zones on roads may be regulated by standard specifications and rules. As an example, traffic safety cones may be used to separate and guide traffic past a construction zone work area. Cones may be specified to be about 18 inches tall, for example. In another example, for high speed and high volume of traffic, or nighttime operations, the cones may be specified to be 28 inches tall, and retro-reflectorized, or comprising bands made of retroreflective material. These examples are for illustration only, and other examples are possible.

FIG. 10A illustrates the vehicle 402 travelling on the road 404 and approaching a construction zone indicated by the construction zone cone 406. The LIDAR sensor coupled to the vehicle 402 may be configured to scan the horizon and provide the computing device with a 3D point cloud of the road 404 and a vicinity of the road 404. Further, the computing device may be configured to determine an area 1002 within a threshold distance 1004 of a surface of the road 404. For example, the threshold distance 1004 may be about 30 inches or more to include cones of standardized lengths (e.g., 18 inches or 28 inches). Other threshold distances are possible based on the standard specifications regulating a particular construction zone. FIG. 10B illustrates a LIDAR-based image 1006 including sets of points representing objects in the area 1002.

Referring back to FIG. 9, at block 906, the method 900 includes identifying one or more construction zone objects in the one or more sets of points. For example, the computing device may be configured to identify shapes of objects represented by the sets of points of the LIDAR-based 3D point cloud. For example, the computing device may be configured to estimate characteristics (e.g., dimensional characteristics) of a shape of an object depicted by a set of points, and may be configured to fit a predetermined shape to the shape to identify the object. As an example, in FIG. 10B, the computing device may be configured to identify a construction zone cone 1008 in the LIDAR-based image 1006.

In an example, to identify the construction zone objects in the sets of points, the computing device may be configured to determine, for each identified construction zone object, a respective likelihood of the identification. As an example, in FIG. 10B, the computing device may be configured to determine a shape of the cone 1008 defined by respective points of a set of points representing the cone 1008. Further, the computing device may be configured to match the shape to one or more shapes of standard construction zone cones. The computing device may be configured to determine a match metric indicative of how similar the shape is to a given standard shape of a typical construction zone cone (e.g., a percentage of match between dimensional characteristics of the shape and the given standard shape). The respective likelihood may be determined based on the match metric.

In another example, in addition to or alternative to identifying the cone 1008 based on shape, the computing device may be configured to cluster points (e.g., the points forming the cone 1008) depicted in the LIDAR-based image 1006 together into a cluster, based on locations of the points or relative locations of the points to each other. The computing device further may be configured to extract from the cluster of points a set of features (e.g., minimum height of the points, maximum height of the points, number of the points, width of the cluster of points, general statistics of the points at varying heights, etc.). The computing device may be configured to process this set of features through a classifier to determine whether the cluster of points represent a given construction zone cone. The classifier can map input information (e.g., the set of features extracted from the cluster of points) to a class (e.g., the cluster represents a construction zone cone). Examples of classifiers, training data, and classification algorithms are described above with regard to block 304 of the method 300 illustrated in FIG. 3.

Further, typical construction zone cones may be required by the standard specifications of construction zones to be made of a retroreflective sheeting materials such as glass beads or prisms, and the computing device may be configured to compare intensity values of points forming the cone 1008 to a threshold intensity value of the retroreflective sheeting material. Based on the comparison, the computing device may be configured to confirm identification of the cone 1008, for example.

In some examples, the computing device may be configured to exclude cones that are away from the road by a certain distance, since such cones may indicate a work zone that is away from the road and may not affect traffic. Also, in an example, the computing device may be configured to exclude sets of points that represent objects that clearly cannot be construction zone cones based on size as compared to a typical size of typical construction zone cones (e.g., too large or too small to be construction zone cones).

In an example, for reliable identification of a construction zone cone, the computing device may be configured to identify the construction zone cone based on LIDAR-based information received from two (or more) consecutive scans by the LIDAR to confirm the identification and filter out false identification caused by electronic or signal noise in a single scan.

Referring back to FIG. 9, at block 908, the method 900 includes determining, using the computing device, a number and locations of the one or more construction zone objects. As an example, in addition to specifying dimensional characteristics and reflective properties of typical construction zone cones, the standard specifications for construction zones also may specify requirements for number of and spacing between the cones. In an example, tighter spacing may be specified, under some conditions, to enhance guidance of vehicles and drivers. Table 1 illustrates an example of minimum spacing between construction zone cones based on speed limits.

TABLE 1

|  | Spacing for Speed A | Spacing for Speed B |
|---|---|---|
| Speed A: 50 mph<br>Speed B: 70 mph | 40 ft | 80 ft |
| Speed A: 35 mph<br>Speed B: 45 mph | 30 ft | 60 ft |
| Speed A: 20 mph<br>Speed B: 30 mph | 20 ft | 40 ft |

These examples are for illustration only. Other examples of spacing requirements are possible as well.

In an example, if respective likelihoods for identification of the identified cones exceed a threshold likelihood, the computing device may be configured to further determine the number and locations of the identified cones. In FIG. 10C, the computing device may be configured to detect or identify, based on the LIDAR-based information, the cone(s) 406 and also determine number of the cone(s) 406 as well as locations or relative locations of the cone(s) 406 with respect to each other. For example, the computing device may be configured to determine a distance 1010 between the cone(s), and compare the distance 1010 with a predetermined distance (or spacing) specified in the standard specifications.

FIG. 10D illustrates a LIDAR-based image 1011 including sets of points representing construction zone cones 1012A-D. In addition to detecting or identifying the construction zone cones 1012A-D in the LIDAR-based image 1011, the computing device may be configured to estimate a respective distance between pairs of cones.

Referring back to FIG. 9, at block 910, the method 900 includes determining, using the computing device, a likelihood of existence of a construction zone, based on the number and locations of the one or more construction zone objects. As an example, a single cone on a side of the road may not be indicative of an active construction zone. Therefore, in addition to detecting presence of or identifying cones on the road, the computing device may be configured, for example, to determine, based on the number and locations (e.g., relative distance) of the cones, that the cones may form a lane boundary and are within a predetermined distance of each other, which may be indicative of an active construction zone causing road changes. The computing device thus may be configured to determine a likelihood or confirm that the cones are indicative of a construction zone, based on the determined number and locations of the cones.

In an example, the computing device may be configured to determine the number and locations of the construction zone cones based on the LIDAR-based information, and compare a pattern formed by the identified construction zone cones to a typical pattern formed by construction zone cones in a typical construction zone (e.g., pattern of cones forming a lane boundary). The computing device may be configured to determine that the detected construction zone cones are associated with a construction zone based on the comparison, and determine the likelihood accordingly.

In another example, the computing device may be configured to generate a probabilistic model (e.g., a Gaussian distribution), based on the determined number and locations of the cones to determine the likelihood of existence of the construction zone. For example, the likelihood may be determined as a function of a set of parameter values that are determined based on the number and locations of the identified cones. In this example, the likelihood may be defined as equal to probability of an observed outcome (the cones are indicative of a construction zone on the road) given those parameter values.

In still another example, the computing device may be configured to process information relating to the number and locations of the cones through a classifier to determine the likelihood. The classifier can map input information (e.g., the number and location of the cones) to a class (e.g., existence of the construction zone). Examples of classifiers and classification algorithms are described above with regard to block 304 of the method 300 illustrated in FIG. 3.

As an example, a training computing device may be configured to receive training data for a plurality of driving situations of a given vehicle. For example, respective training data may include, for each of the plurality of driving situations, respective LIDAR-based information relating to a respective 3D point cloud of a respective road. Based on the respective LIDAR-based information of the respective training data, the computing device may be configured to identify respective cones as well as determine respective number and locations of the respective cones. Also, the computing device may be configured to receive positive or negative indication of respective existence of a respective construction zone corresponding to the respective training data for each of the driving situations. Further the training computing device may be configured to correlate, for each driving situation, the positive or negative indication with the respective training data, and determine parameters (e.g., vector of weights for equation 1) of the classifier based on the correlations for the plurality of driving situations. These parameters may be provided to the computing device configured to control the vehicle such that as the computing device receives the LIDAR-based information, the computing device may be configured to process the LIDAR-based information through the classifier using the determined parameters of the classifier to determine the likelihood.

In one example, the likelihood may be qualitative such as "low," "medium," "high" or may be numerical such as a number on a scale, for example. Other examples are possible.

Referring back to FIG. 9, at block 912, the method 900 includes modifying, using the computing device, a control strategy associated with a driving behavior of the vehicle, based on the likelihood of the existence of the construction zone on the road. The computing device may be configured to modify or select, based on the determined likelihood of the existence of the construction zone, a control strategy comprising rules for actions that control the vehicle speed to safely maintain a distance with other objects and select a lane that is considered safest given road changes due to the existence of the construction zone. Examples of modifying the control strategy based on the likelihood are described above with regard to block 306 of the method 300 illustrated in FIG. 3.

At block 914, the method 900 includes controlling, using the computing device, the vehicle based on the modified control strategy. Controlling the vehicle may include adjusting translational velocity, or rotational velocity, or both, of the vehicle based on the modified driving behavior. Examples of controlling the vehicle based on the modified control strategy are described above with regard to block 308 of the method 300 illustrated in FIG. 3.

In some embodiments, the disclosed methods may be implemented as computer program instructions encoded on a computer-readable storage media in a machine-readable format, or on other non-transitory media or articles of manufacture. FIG. 11 is a schematic illustrating a conceptual partial view of an example computer program product 1100 that includes a computer program for executing a computer process on a computing device, arranged according to at least some embodiments presented herein. In one embodiment, the example computer program product 1100 is provided using a signal bearing medium 1101. The signal bearing medium 1101 may include one or more program instructions 1102 that, when executed by one or more processors may provide functionality or portions of the functionality described above with respect to FIGS. 1-10. Thus, for example, referring to the embodiments shown in FIGS. 3, 5, 7, and 9, one or more features of blocks 302-308, 502-512, 702-712, and 902-914 may be undertaken by one or more instructions associated with the signal bearing medium 1101. In addition, the program instructions 1102 in FIG. 11 describe example instructions as well.

In some examples, the signal bearing medium 1101 may encompass a computer-readable medium 1103, such as, but not limited to, a hard disk drive, a Compact Disc (CD), a Digital Video Disk (DVD), a digital tape, memory, etc. In some implementations, the signal bearing medium 1101 may encompass a computer recordable medium 1104, such as, but not limited to, memory, read/write (R/W) CDs, R/W DVDs, etc. In some implementations, the signal bearing medium 1101 may encompass a communications medium 1105, such as, but not limited to, a digital and/or an analog communication medium (e.g., a fiber optic cable, a waveguide, a wired communications link, a wireless communication link, etc.). Thus, for example, the signal bearing medium 1101 may be conveyed by a wireless form of the communications medium 1105 (e.g., a wireless communications medium conforming to the IEEE 802.11 standard or other transmission protocol).

The one or more programming instructions 1102 may be, for example, computer executable and/or logic implemented instructions. In some examples, a computing device such as the computing device described with respect to FIGS. 1-10 may be configured to provide various operations, functions, or actions in response to the programming instructions 1102 conveyed to the computing device by one or more of the computer readable medium 1103, the computer recordable medium 1104, and/or the communications medium 1105. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:

receiving map information related to a prior map of a road of travel of a vehicle, wherein the map information includes road traffic sign information that indicates locations and types of traffic signs that existed on the road;

detecting, by a computing device using one or more sensors coupled to the vehicle, a traffic sign, and determining that the traffic sign is missing from the map information;

in response to at least determining that the detected traffic sign is missing from the map information determining, using the computing device, a likelihood of existence of a construction zone on the road;

in response to the likelihood exceeding a threshold likelihood, detecting one or more construction zone objects;

determining a severity of road changes based on a number and locations of the one or more construction zone objects; and providing, by the computing device, instructions to control the vehicle based on the likelihood and the severity of road changes.

2. The method of claim 1, further comprising:
based on detecting the traffic sign, receiving, from a plurality of sources of information, information relating to detection of the construction zone, wherein determining the likelihood of existence of the construction zone is further based on the information.

3. The method of claim 2, wherein each source of information of the plurality of sources of information is assigned a respective reliability metric indicative of a level of confidence of the detection of the construction zone based on previously collected data from a plurality of driving situations involving other construction zones, and wherein determining the likelihood of existence of the construction zone is further based on the respective reliability metrics of the plurality of sources of information.

4. The method of claim 2, wherein the information received from the plurality of sources of information includes one or more of:
(i) image-based information;
(ii) LIDAR-based information;
(iii) RADAR-based information; and
(iv) traffic information.

5. The method of claim 4, wherein the image-based information is received from one or more image-capture devices coupled to the computing device, and wherein the image-based information is indicative of (i) location of one or more static objects with respect to the road, and (ii) road geometry.

6. The method of claim 4, wherein the traffic information is indicative of behavior of other vehicles on the road and includes respective information received from one or more of: (i) Global Positioning Satellite (GPS) devices in the other vehicles on the road, (ii) vehicle-to-infrastructure communication, (iii) vehicle-to-vehicle communication, (iv) traffic report broadcast, and (v) on-board or off-board sensors in communication with the computing device.

7. The method of claim 4, wherein the information includes the traffic information, and wherein determining the likelihood comprises determining a change in nominal speed and flow of traffic of other vehicles on the road based on the traffic information.

8. The method of claim 1, wherein the one or more sensors coupled to the vehicle include an image-capture device and a light detection and ranging (LIDAR) sensor, the method further comprising:
receiving, from the image-capture device, an image depicting the traffic sign missing from the map information;
receiving, from the LIDAR, LIDAR-based information comprising a three-dimensional (3D) point cloud corresponding to the image depicting the traffic sign, wherein the 3D point cloud comprises a set of points based on light emitted from the LIDAR sensor and reflected from a surface of the traffic sign;
determining, based on the image, a first likelihood that traffic sign is a candidate construction zone sign; and
determining a second likelihood that the traffic sign is a candidate construction zone sign, based on the LIDAR-based information, wherein determining the likelihood of existence of the construction zone on the road is based on the first likelihood and the second likelihood.

9. A non-transitory computer readable medium having stored thereon instructions that, when executed by a computing device, cause the computing device to perform functions comprising:
receiving map information related to a prior map of a road of travel of a vehicle, wherein the map information includes road traffic sign information that indicates locations and types of traffic signs that existed on the road;
detecting, using one or more sensors coupled to the vehicle, a traffic sign, and determining that the traffic sign is missing from the map information;
in response to at least determining that the detected traffic sign is missing from the map information determining a likelihood of existence of a construction zone on the road;
in response to the likelihood exceeding a threshold likelihood, detecting one or more construction zone objects;
determining a severity of road changes based on a number and locations of the one or more construction zone objects; and
controlling the vehicle based on the likelihood and the severity of road changes.

10. The non-transitory computer readable medium of claim 9, wherein the functions further comprise:
based on detecting the traffic sign, receiving, from a plurality of sources of information, information relating to detection of the construction zone, wherein the function of determining the likelihood of existence of the construction zone is further based on the information.

11. The non-transitory computer readable medium of claim 10, wherein each source of information of the plurality of sources of information is assigned a respective reliability metric indicative of a level of confidence of the detection of the construction zone based on previously collected data from a plurality of driving situations involving other construction zones, and wherein the function of determining the likelihood of existence of the construction zone is further based on the respective reliability metrics of the plurality of sources of information.

12. A control system for a vehicle, comprising:
one or more sensors coupled to the vehicle;
one or more processors in communication with the one or more sensors; and
memory configured to store instructions, that when executed by the one or more processors, cause the control system to perform functions comprising:
receiving map information related to a prior map of a road of travel of a vehicle, wherein the map information includes road traffic sign information that indicates locations and types of traffic signs that existed on the road;
detecting, using one or more sensors coupled to the vehicle, a traffic sign, and determining that the traffic sign is missing from the map information;
in response to at least determining that the detected traffic sign is missing from the map information, determining a likelihood of existence of a construction zone on the road;
in response to the likelihood exceeding a threshold likelihood, detecting one or more construction zone objects;
determining a severity of road changes based on a number and locations of the one or more construction zone objects; and
controlling the vehicle based on the likelihood and the severity of road changes.

13. The control system of claim 12, wherein the one or more sensors coupled to the vehicle comprise an image-capture device and a light detection and ranging (LIDAR) sensor, and wherein the functions further comprise:
receiving, from the image-capture device, an image depicting the traffic sign missing from the map information;
receiving, from the LIDAR, LIDAR-based information comprising a three-dimensional (3D) point cloud corresponding to the image depicting the traffic sign, wherein the 3D point cloud comprises a set of points based on light emitted from the LIDAR sensor and reflected from a surface of the traffic sign;

determining, based on the image, a first likelihood that the traffic sign is a candidate construction zone sign; and determining a second likelihood that the traffic sign is a candidate construction zone sign, based on the LIDAR-based information, wherein the function of determining the likelihood of existence of the construction zone on the road is based on the first likelihood and the second likelihood.

14. The control system of claim 12, wherein the functions further comprise:

based on detecting the traffic sign, receiving, from a plurality of sources of information, information relating to detection of the construction zone, wherein:

each source of information of the plurality of sources of information is assigned a respective reliability metric indicative of a level of confidence of the detection of the construction zone based on previously collected data from a plurality of driving situations involving other construction zones, and the function of determining the likelihood of existence of the construction zone is further based on the information and respective reliability metrics of the plurality of sources of information.

15. The control system of claim 12, wherein the control system is configured to control the vehicle in an autonomous mode of operation.

* * * * *